US009055528B2

(12) United States Patent
Shukair et al.

(10) Patent No.: US 9,055,528 B2
(45) Date of Patent: Jun. 9, 2015

(54) DETERMINATION OF NCS PARAMETER AND LOGICAL ROOT SEQUENCE ASSIGNMENTS

(71) Applicant: Qualcomm Incorporated, San Diego, CA (US)

(72) Inventors: Mutaz Zuhier Afif Shukair, San Diego, CA (US); Sandip Sarkar, San Diego, CA (US); Salil Sawhney, San Diego, CA (US); Kausik Ray Chaudhuri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 172 days.

(21) Appl. No.: 13/761,149

(22) Filed: Feb. 6, 2013

(65) Prior Publication Data

US 2014/0219109 A1 Aug. 7, 2014

(51) Int. Cl.
*H04W 72/00* (2009.01)
*H04W 56/00* (2009.01)
*H04W 74/08* (2009.01)

(52) U.S. Cl.
CPC ...... *H04W 56/0045* (2013.01); *H04W 74/0833* (2013.01)

(58) Field of Classification Search
None
See application file for complete search history.

(56) References Cited

U.S. PATENT DOCUMENTS

| 5,732,352 | A | 3/1998 | Gutowski et al. | |
| 2010/0074372 | A1 | 3/2010 | Mauritz | |
| 2010/0075693 | A1* | 3/2010 | Kishigami et al. | 455/452.2 |
| 2011/0280284 | A1* | 11/2011 | Nakao et al. | 375/140 |
| 2012/0236737 | A1 | 9/2012 | Bergman | |
| 2014/0086224 | A1* | 3/2014 | Kwon et al. | 370/336 |

FOREIGN PATENT DOCUMENTS

| CN | 101873712 A | 10/2010 |
| CN | 102149200 A | 8/2011 |
| CN | 102281542 A | 12/2011 |
| EP | 1475982 A1 | 10/2004 |

(Continued)

OTHER PUBLICATIONS

Catt, "PRACH Parameters Exchange Between eNBs", 3GPP Draft; R3-091570, 3rd Generation Partnership Project (3GPP), Mobile Competence Centre; 650, Route Des Lucioles; F-06921 Sophia-Antipolis Cedex; France, No. Shenzhen, China; 20090820, Aug. 20, 2009, XP050352990; 4 pages.

(Continued)

*Primary Examiner* — Chi H Pham
*Assistant Examiner* — Shick Hom
(74) *Attorney, Agent, or Firm* — Knobbe Martens Olson & Bear LLP

(57) ABSTRACT

Methods, systems, and devices are described for dynamically adjusting a ZeroCorrelationZoneConfig (Ncs) parameter of a base station. An initial Ncs parameter is set for the base station. A determination is made as to whether a count of timing synchronization failures between a mobile device and the base station exceeds a threshold. A determination is also made as to whether the timing synchronization failures correspond to a predetermined range of timing advanced (TA) estimated values. Upon determining that the count of timing synchronization failures exceeds the threshold and that the failures correspond to the predetermined range of TA estimated values, the initial Ncs parameter is dynamically adjusted.

40 Claims, 16 Drawing Sheets

(56) References Cited

FOREIGN PATENT DOCUMENTS

| WO | WO-2010002303 A1 | 1/2010 |
| WO | WO-2012063350 A1 | 5/2012 |
| WO | WO-2013069850 A1 | 5/2013 |

OTHER PUBLICATIONS

International Search Report and Written Opinion—PCT/US2014/012751-ISA/EPO—Sep. 3, 2014.
Partial International Search Report—PCT/US2014/012751—ISA/EPO—Jun. 3, 2014.

* cited by examiner

DETERMINATION OF NCS PARAMETER AND LOGICAL ROOT SEQUENCE ASSIGNMENTS

BACKGROUND

The following relates generally to wireless communication, and more specifically to systems and methods to identify and optimize ZeroCorrelationZoneConfig (Ncs) parameter and logical root sequence assignments. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. At power-on, or after a long standby time, a mobile device may not be synchronized with the base station. To achieve synchronization, the mobile device may carry out a Random Access (RA) procedure with the base station. In order to distinguish between different mobile devices performing an RA procedure, different preambles may be transmitted by different mobile stations to request access to the base station. Preamble structures may have a certain level of orthogonality to distinguish between different users. Such preambles may be derived from cyclic sequences. Different preambles may be derived from a same base sequence by introducing cyclic shifts or different preambles may be derived from different base sequences. A base station may have one or more base sequences assigned to it along with an allowed cyclic shift. The Ncs parameter indicates the amount of cyclic shift of the root sequence (or base sequence) to provide orthogonality between different preambles generated from each shift of the root sequence. Different roots (or groups of roots) may be assigned to different base stations so that preambles generated by devices in the coverage area of one base station are not detected by another base station. Moreover, a minimum physical distance should be secured before reusing the same root sequences at another base station. The physical distance should be far enough to allow attenuation for possible users performing random access channel (RACH) procedures with their serving base station.

Planning the use of root sequences in networks is a non-trivial task. This planning may be assisted by implementing Self-Optimizing Network (SON) features to allow the optimum values for certain parameters to be derived based on actual measurements. The number of root sequences used by a base station should be minimized to allow for larger reuse distance, (i.e., the distance between base stations that use the same root sequences may be increased). However, reducing the number of root sequences used by a base station implies reducing the length of the cyclic shift (i.e., reducing the Ncs parameter). The length of the cyclic shift depends on the size of the cell of the base station and it cannot be reduced too much.

SUMMARY

The described features generally relate to one or more improved systems, methods, and/or apparatuses for dynamically adjusting a ZeroCorrelationZoneConfig (Ncs) parameter of a base station. An initial Ncs parameter is set for the base station. A determination is made as to whether a count of timing synchronization failures between a mobile device and the base station exceeds a threshold. A determination is also made as to whether the timing synchronization failures correspond to a predetermined range of timing advanced (TA) estimated values. Upon determining that the count of timing synchronization failures exceeds the threshold and that the failures correspond to the predetermined range of TA estimated values, the initial Ncs parameter is dynamically adjusted.

In one configuration, an occurrence of a timing synchronization failure may be detected. Detecting the occurrence of the timing synchronization failure may include receiving a first message comprising a preamble, generating a preamble identification (ID) for the received preamble, transmitting a second message comprising the preamble ID, and upon transmission of the second message, detecting a non-receipt of a third message.

In one embodiment, detecting the occurrence of the timing synchronization failure may include receiving a first message comprising a physical random access channel (PRACH) preamble, generating preamble ID for the received PRACH preamble, transmitting a second message comprising the preamble ID, and upon transmission of the second message, detecting a non-receipt of a third message in response to the second message.

In one example, TA value may be estimated for the received PRACH preamble. The TA value may indicate a first coverage area of the base station. In one embodiment, a count may be maintained of timing synchronization failures that occur in the first coverage area of the base station.

In one configuration, information indicating an assignment of one or more root sequences assigned to the base station may be inserted into a token. The one or more root sequences may be used to generate a PRACH preamble. The token may be released to a second base station.

In one embodiment, a token may be received from a second base station. Information indicating an assignment of one or more root sequences assigned to the second base station may be extracted from the received token. The one or more root sequences may be used to generate a PRACH preamble. An assignment of one or more root sequences assigned to the base station may be adjusted based on the extracted information. In one example, the token may trigger the base station to determine whether to adjust a current Ncs parameter of the base station.

In one configuration, assignments of root sequences may be coordinated among a plurality of base stations. The root sequences may be used to generate PRACH preambles. Coordinating the assignments of the root sequences may include receiving instructions from a centralized server to determine whether to adjust one or more root sequences currently assigned to the base station. In one embodiment, coordinating the assignments of the root sequences may include receiving a token from one of the plurality of base stations. The token may trigger the base station to determine whether to adjust one or more root sequences currently assigned to the base station.

In one example, upon determining that the count of communication failures fails to exceed the threshold, the Ncs parameter may be reduced.

A base station configured to adjust an Ncs parameter is also described. The base station may include a processor and a memory in electronic communication with the processor. The memory may embody instructions. The instructions may be executable by the process to set an initial Ncs parameter, determine whether a count of timing synchronization failures between a mobile device and the base station exceeds a threshold, and upon determining that the count of timing synchronization failures exceeds the threshold, dynamically adjusting the initial Ncs parameter.

An apparatus to adjust an Ncs parameter is also described. The apparatus may include means for setting an initial Ncs parameter, means for determining whether a count of timing synchronization failures between a mobile device and a base station exceeds a threshold, and upon determining that the count of timing synchronization failures exceeds the threshold, means for dynamically adjusting the initial Ncs parameter.

A computer program product to adjust an Ncs parameter of a base station is also described. The computer program product may include a non-transitory computer-readable medium storing instructions executable by a processor to set an initial Ncs parameter, determine whether a count of timing synchronization failures between a mobile device and the base station exceeds a threshold, and upon determining, that the count of timing synchronization failures exceeds the threshold, dynamically adjust the initial Ncs parameter.

A method for generating a report to be used to determine whether to adjust an Ncs parameter of a base station is also described. A first message may be transmitted to the base station. The first message may include a preamble. A second message may be received from the base station that includes a preamble ID. A log may be maintained that indicates whether a transmission of a third message to the base station is aborted. The report, including the log, may be transmitted to the base station. The report may be used by the base station to determine whether to adjust the Ncs parameter.

In one embodiment, the report may include a bit of information that instructs the base station to adjust the Ncs parameter. The report may be processed to determine whether to instruct the base station to adjust the Ncs parameter. In one configuration, the report may be transmitted without processing the report to determine whether to instruct the base station to adjust the Ncs parameter. In one embodiment, the report may be transmitted to the base station upon receiving a request from the base station. The report may be transmitted to the base station according to a reporting timing cycle.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In Long Term Evolution (LTE) systems, Physical Random Access Channel (PRACH) preambles may be derived from a base root sequence (e.g., a Zadoff-Chu sequence). To increase the number of available sequences, while keeping a certain level of orthogonality between different preambles derived from each base root sequences, a cyclic shift may be applied over the base root sequence. The value of the cyclic shifts of the root sequences (i.e., base sequences) may be represented by a ZeroCorrelationZoneConfig (Ncs) parameter. According to aspects of the present systems and methods, a Self-Optimized Network (SON) may allow base stations and network configurations to be automatically adjusted based on real measurements. In one configuration, the present systems and methods allow an SON in an LTE environment to adjust Ncs values based on measurements (e.g., counts) of timing synchronization failures that occur during a RACH process. For example, the Ncs value may be adjusted to an optimized value by counting the number of incorrectly decoded PRACH preambles that are detected as originating from a certain geographical region of a coverage area of the base station. The present systems and methods may also allow a base station to adjust its assignment of root sequences based on the root sequences assigned to neighboring base stations.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
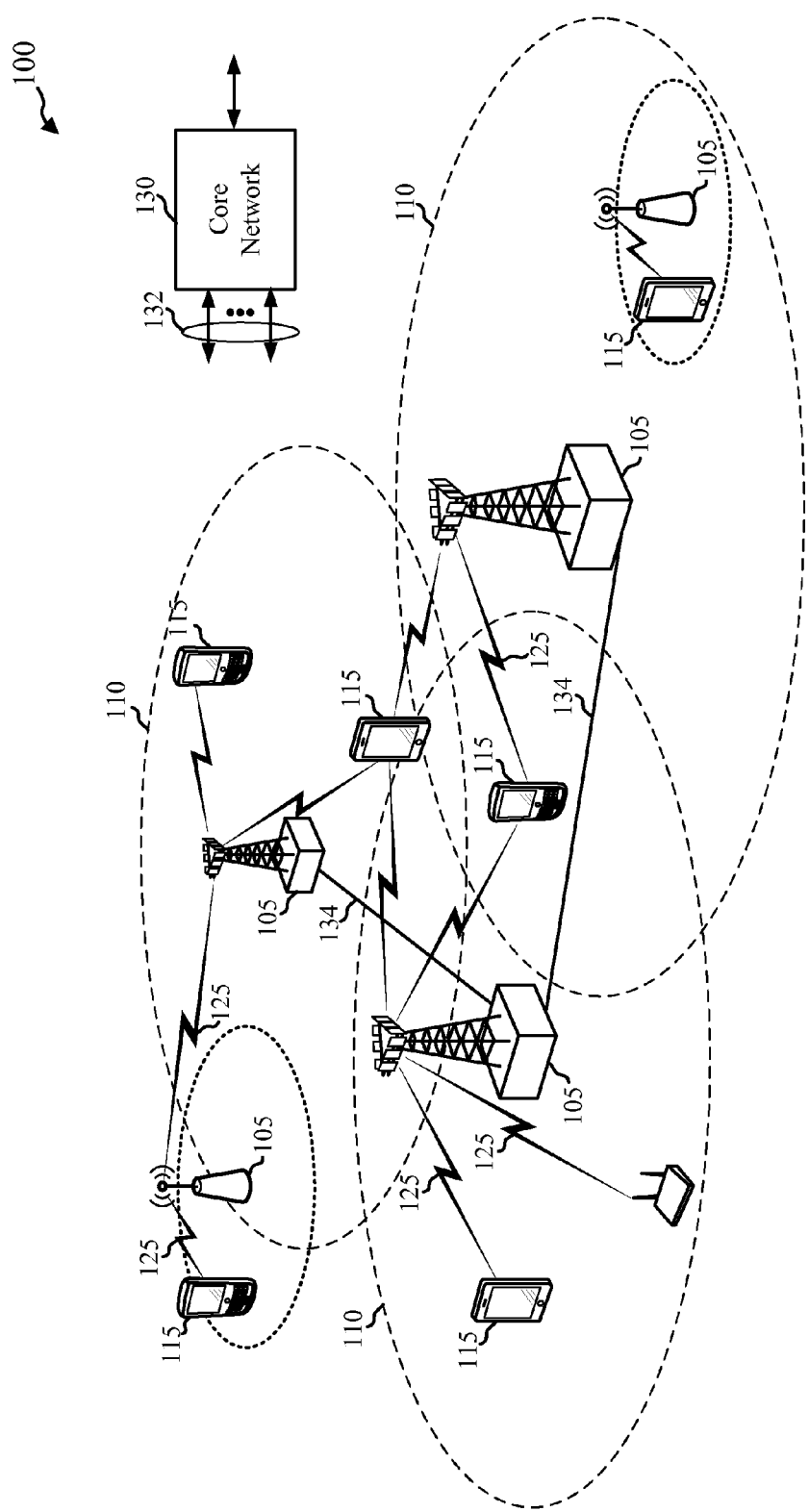
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller, which may be part of the core network 130 or the base stations 105 in various embodiments. Base stations 105 may communicate control information and/or user data with the core network 130 through backhaul links 132. In some embodiments, the base stations 105 may communicate, either directly or indirectly, with each other over backhaul links 132, which may be wired or wireless communication links. The system 100 may support operation on multiple carriers (waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, an evolved NodeB (eNodeB or eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

In some embodiments, the system 100 may be an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In one embodiment, an eNB 105 may set an initial Ncs parameter that defines a shift of root sequences. The root sequences may be available to UEs to generate preambles to carry out a timing synchronization procedure with the eNB 105. The eNB 105 may determine whether a count of timing synchronization failures between itself and a UE 115 exceeds a threshold. If the number of failures exceeds the threshold, the eNB 105 may dynamically adjust its initial Ncs parameter. By adjusting the Ncs parameter, the assignment of root sequences to the eNB 105 changes. The eNB 105 may communicate these changes to a neighboring eNB. The neighboring eNB may also determine whether to adjust its Ncs parameter (which would alter its assignment of root sequences). The neighboring eNB may then report its changes to another neighboring eNB. This process may continue through each eNB in the system 100.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 may be dispersed throughout the wireless system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In one configuration, the UE 115 may maintain a log that includes a number of timing synchronization failures that have occurred between the UE 115 and an eNB 105. The UE 115 may process this log and transmit a report to the eNB 105 indicating whether or not the Ncs parameter of the eNB 105 should be adjusted. The UE 115 may also transmit the log without processing the log. The eNB 105 may then use the log to perform the processing to determine whether or not to adjust its Ncs parameter.

The transmission links 125 shown in network 100 may include uplink transmissions from a mobile device 115 to a base station 105, and/or downlink transmissions, from a base station 105 to a mobile device 115. The downlink transmissions may also be called forward link transmissions while the uplink transmissions may also be called reverse link transmissions. While the wireless system 100 is described in relation to LTE/LTE-Advanced architectures, those skilled in the art will readily appreciate, the various concepts presented throughout this disclosure may be extended to other types of wireless networks.

Figure 2:
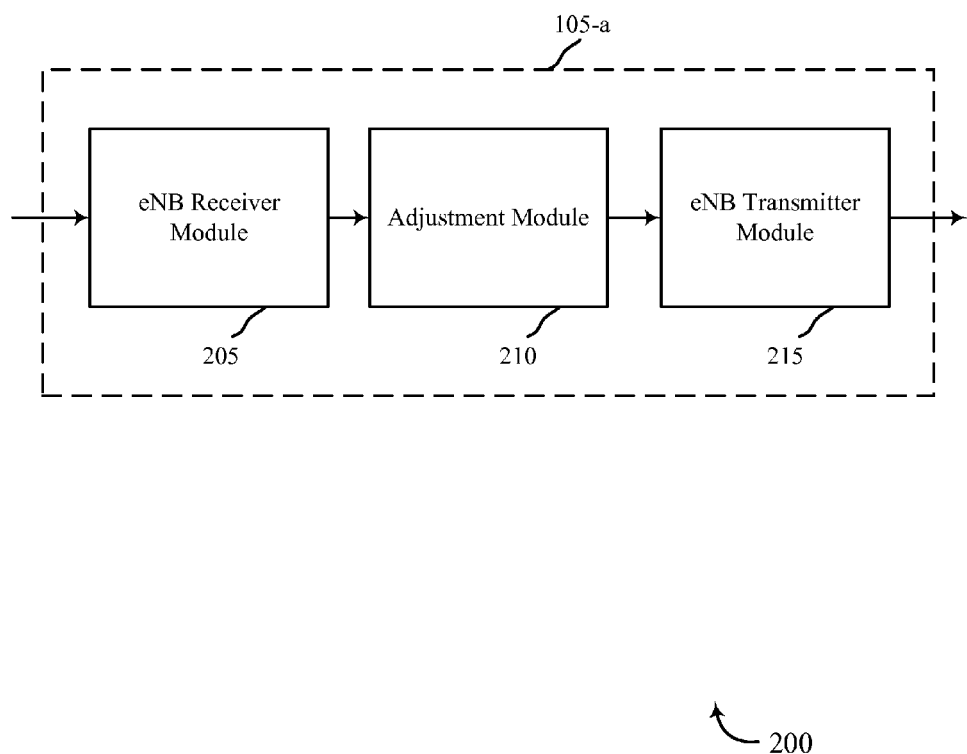
FIG. 2 is a block diagram illustrating one embodiment of an evolved NodeB (eNB), in accordance with the present systems and methods.

FIG. 2 is a block diagram 200 illustrating one embodiment of an eNB 105-a, in accordance with the present systems and methods. The eNB 105-a may be an example of the eNB 105 of FIG. 1. The eNB 105-*a* may include an eNB receiver module 205, an adjustment module 210, and an eNB transmitter module 215. The eNB 105-*a* may be part of a Self Optimized Network (SON). Each of these components may be in communication with each other.

These components of the eNB 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the eNB receiver module 205 may receive communications from one or more UEs 115 and/or from one or more other eNBs. The adjustment module 210 may determine whether certain parameters of the eNB 105-*a* should be adjusted. For example, the eNB 105-*a* may set initial parameters to use for wireless communications with the UEs 115. The adjustment module 210 may analyze the communications between the eNB 105-*a* and the UEs 115 to determine whether one or more of these parameters should be adjusted. The eNB transmitter module 215 may transmit communications to one or more UEs 115 and/or to one or more other eNBs. Further details regarding the adjustment module 210 of the eNB 105-*a* will be described below.

Figure 3:
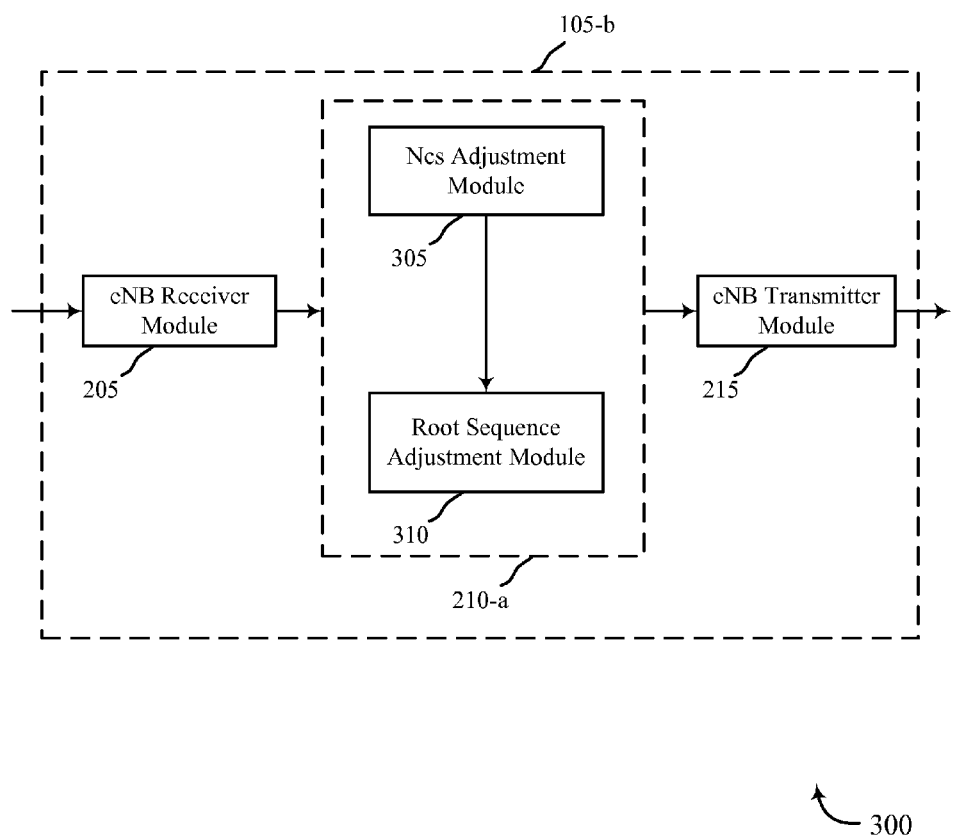
FIG. 3 is a block diagram illustrating a further embodiment of an eNB, in accordance with the present systems and methods.

FIG. 3 is a block diagram 300 illustrating a further embodiment of an eNB 105-*b*, in accordance with the present systems and methods. The eNB 105-*b* may be an example of the eNB 105 of FIGS. 1 and/or 2. The eNB 105-*b* may include an eNB receiver module 205, an adjustment module 210-*a*, and an eNB transmitter module 215. In one configuration, the eNB 105-*b* may be part of a SON. Each of these components may be in communication with each other.

These components of the eNB 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The eNB receiver module 205 and the eNB transmitter module 215 may operate as previously described. The adjustment module 210-*a* may include an Ncs adjustment module 305 and a root sequence adjustment module 310. In one configuration, the Ncs adjustment module 305 may determine whether a current Ncs parameter set at the eNB 105-*b* should be adjusted. Upon determining that an adjustment to the parameter should be performed, the Ncs adjustment module 305 may adjust the parameter. The root sequence adjustment module 310 may determine whether to adjust the assignment of root sequences currently assigned to the eNB 105-*b*. In one configuration, the root sequence adjustment module 310 may receive information from the Ncs adjustment module 305. The received information may indicate the adjustment of the Ncs parameter. Upon receiving the adjustment information for the Ncs parameter, the root sequence adjustment module 310 may adjust the assignment of root sequences currently assigned to the eNB 105-*b*. The eNB transmitter module 215 may transmit information to neighboring eNBs indicating the adjustment of the root sequences assigned to the eNB 105-*b*.

Figure 4:
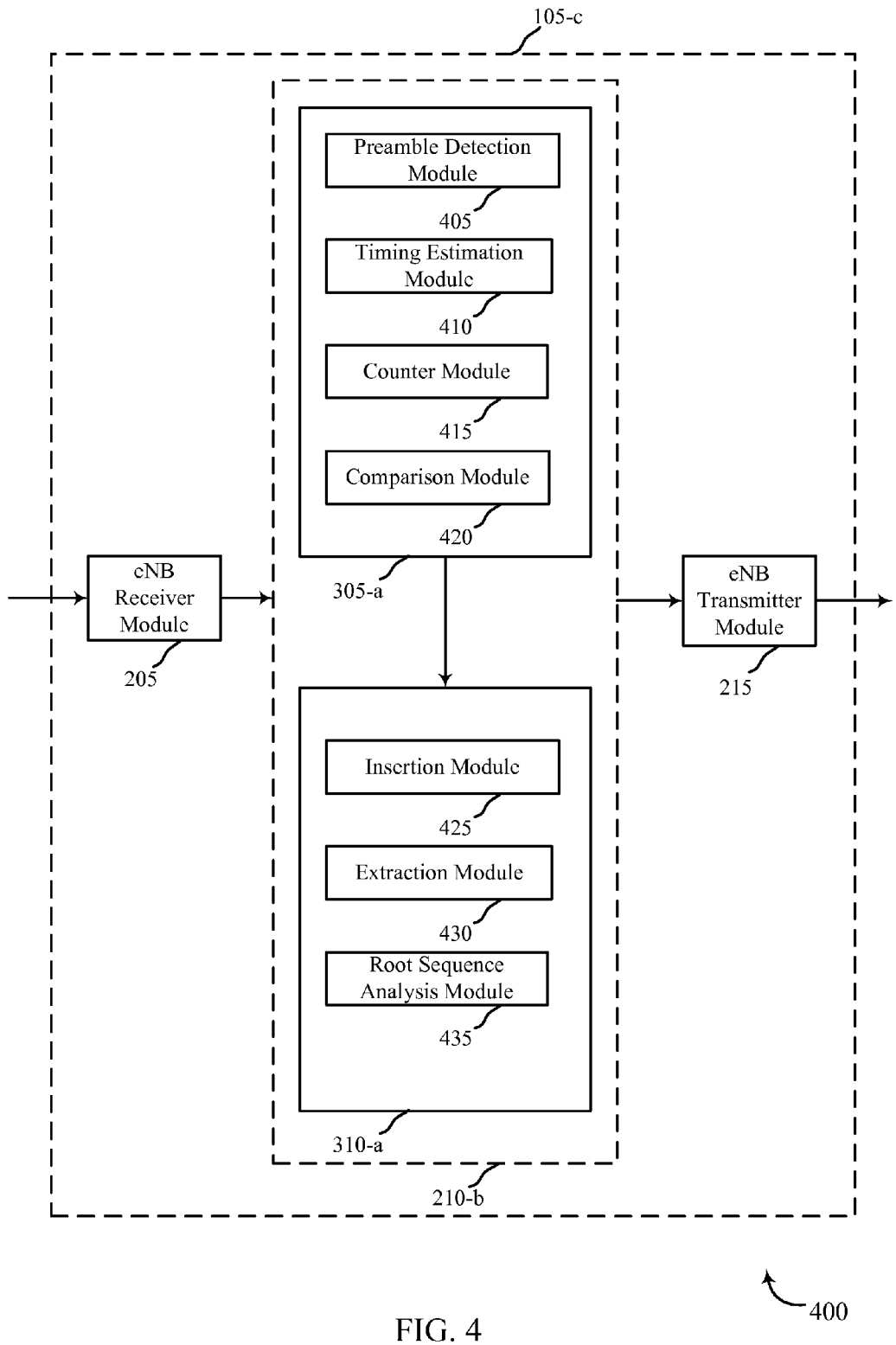
FIG. 4 is a block diagram illustrating an additional embodiment of an eNB, in accordance with the present systems and methods.

FIG. 4 is a block diagram 400 illustrating a further embodiment of an eNB 105-*c*, in accordance with the present systems and methods. The eNB 105-*c* may be an example of the eNB 105 of FIGS. 1, 2, and/or 3. The eNB 105-*c* may include an eNB receiver module 205, an adjustment module 210-*b*, and an eNB transmitter module 215. In one example, the eNB 105-*c* may be part of a SON. Each of these components may be in communication with each other.

These components of the eNB 105-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The eNB receiver module 205 and the eNB transmitter module 215 may operate as previously described. The adjustment module 210-*b* may include an Ncs adjustment module 305-*a*. In one configuration, the Ncs adjustment module 305-*a* may include a preamble detection module 405, a timing estimation module 410, a counter module 415, and a comparison module 420.

In one embodiment, the preamble detection module 405 may detect the receipt of one or more preambles via the eNB receiver module 205. A preamble may be sent as part of a first message (e.g., MSG1) from a UE 115. The preamble may be a PRACH preamble sent by the UE 115 to initialize a connection setup procedure with the eNB 105-*c*. The PRACH preamble may be derived from a root sequence (e.g., a Zadoff-Chu sequence). In one embodiment, there may be a total of 893 root sequences available to generate PRACH preambles. In one configuration, the eNB 105-*c* may configure the served UE 115 with the root sequence(s) from which the UE 115 may generate 64 preambles to use as MSG1 of the RACH process. In order for eNBs to distinguish between different UEs initializing a connection setup procedure, different PRACH preambles may be transmitted by the different UEs. A UE may randomly pick a preamble out of a pool and transmit it to an eNB. In one embodiment, each cell of an eNB 105, may include 64 RACH preambles that are available for the UE to choose from.

Upon detecting the receipt of a preamble, the preamble detection module 405 may perform a mathematical correlation for the received signal and set of root sequences to determine which preamble ID (or sequence) was detected. When the module 405 identifies a match (or a partial match) between the detected preamble and a reference root sequence, the preamble detection module 405 may generate a preamble identification (ID). The preamble ID may represent the preamble that the eNB 105-*c* believes was selected and transmitted by the UE 115 to initialize the connection setup procedure. The "preamble ID" may be a conventional naming used in 3GPP standards to identify a certain root sequence. The preamble ID may also be relative to the base sequence (also referred to as a PRACH physical root) that is configured by the eNB.

PRACH physical roots may also be mapped in 3GPP specifications through one or more tables to PRACH logical roots. In one embodiment, PRACH logical roots may allow a UE 115 to derive the order of which physical roots are being used. For example, if the number of required physical roots is "X" for a certain Ncs value, the eNB 105-c may indicate only the first logical root to the UE. The UE may derive the actual physical roots and their usage order by utilizing the defined 3GPP standard.

In one configuration, the timing estimation module 410 may estimate a timing advanced (TA) value that estimates the propagation delay between the eNB 105-c and the UE that 115 sent the preamble. As a result, the TA may represent the distance from the eNB 105-c or the relative geographical region of the coverage area of the eNB 105-c, as perceived by the eNB 105-c, from which the preamble originated. For example, a large TA may indicate that the eNB 105-c perceives that the UE 115 that sent the preamble is located farther away from the eNB 105-c. The eNB transmitter module 215 may transmit a second message (e.g., MSG2) to the UE 115. The second message may include the preamble ID and the TA value estimated by the eNB 105-c. When the eNB 105-c detects a certain preamble ID and estimates the TA value, the eNB may communicate this information, along with other information, to the UE 115 utilizing MSG2.

In one example, the counter module 415 may maintain a count of the number of times a third message (e.g., MSG3) is not received after the second message is transmitted to the UE 115. In one embodiment, when the UE 115 receives the second message with the preamble ID and TA value, the UE 115 may analyze the preamble ID to determine whether the preamble ID identifies the correct preamble that was selected and transmitted by the UE 115 as part of the first message. If the UE 115 determines that the preamble ID incorrectly identifies the preamble, the UE 115 may abort the transmission of the third message. In one configuration, the UE 115 may attempt to initialize MSG1 transmission again.

When the counter module 415 detects a non-receipt of the third message, the module 415 may analyze the TA value that was sent with the preamble ID. If the TA value represents a certain geographical area of the cell (or certain distance relative to the cell), the counter module 415 may increase a counter. For example, if the TA value is small (indicating that the eNB 105-c perceives that the first message with the preamble was received from a UE 115 located relatively close to the eNB 105-c), the counter module 415 may increase the counter when it determines that the third message is not received from the UE 115. The comparison module 420 may compare the counter with a threshold value. When the counter for a certain area of the cell exceeds the threshold value, the Ncs adjustment module 305-a may adjust the current Ncs parameter of the eNB 105-c.

In one configuration, the adjustment module 210-b may also include a root sequence adjustment module 310-a. The module 310-a may include an insertion module 425, an extraction module 430, and a root sequence analysis module 435. In one embodiment, the insertion module 425 may insert information regarding the current assignment of root sequences to the eNB 105-c into a token. In one embodiment, if the Ncs parameter is adjusted by the Ncs adjustment module, the root sequences assigned to the eNB 105-c will also be adjusted. The insertion module 425 may insert the updated assignments of root sequences into the token. The extraction module 430 may extract information from a token received from a neighboring eNB. The root sequence analysis module 435 may analyze the extracted information to determine the root sequences assigned to the neighbor eNB that sent the token. Based on this analysis, the root sequence adjustment module 310-a may adjust the current assignment of root sequences assigned to the eNB 105-c based on the root sequences assigned to the neighboring eNB. Upon adjusting the root sequence assignment, the eNB 105-c may determine whether its Ncs parameter should be adjusted. If the Ncs parameter is adjusted, the assignment of root sequences to the eNB 105-c are again updated and the updated assignment information is inserted into the token by the insertion module 425. The token may then be transmitted via the eNB transmitter module 215 to another neighboring eNB.

In one embodiment, the receipt of the token may trigger an eNB to determine whether to adjust its Ncs parameter. In one configuration, the eNB may perform this determination after receiving the token. eNBs that do not have the token, may not carry out the procedure to determine whether their Ncs parameters should be adjusted. Other approaches may be also used without using an explicit token. For example a centralized server may be used, or a predefined order of eNBs may be used to determine which eNB should perform the procedure to determine whether to adjust its Ncs parameter. In addition, this process of determining whether to adjust an Ncs parameter may be ran at each eNB or at a centralized processing unit or server. This process may also be performed via simulation tools or network planning software with or with out direct interaction with components of a live network (e.g., eNBs, UEs, etc.).

In one embodiment, a last used logical root (LULR), as defined in this disclosure, may represent the logical root value that corresponds to the last physical root sequence used in a certain eNB. In one example, LULR may be mapped to a starting physical root, as described in 3GPP standards. As previously explained, in LTE there are 839 physical roots that may be used to generate preambles (i.e., MSG1). Neighbor eNBs, however, should not use the same physical roots. When eNBs are separated by a long distance (e.g., where path loss attenuation allows to mitigate the potential interference), they may use the same root sequences.

As a results of Ncs dimensioning of the present systems and methods, the number of required physical roots at each eNB may change. To ensure that all the physical roots are being utilized after changes to Ncs parameters occur, a Logical Roots Packing Algorithm may be used by the root sequence adjustment module 310-b. In one embodiment, the LULR for a previous eNB may be extracted from a received token via the extraction module 430. The new logical root may be adjusted according to equation 1:

$$\text{Lseq\_new} = \text{LULR} + Dv \qquad \text{Equation 1}$$

In one embodiment, Dv may represent a packing distance between roots assigned to different eNBs. Dv may be positive value, a negative value, or zero. In one configuration, Dv=0 may indicate that an overlap exists with the last used logical root and a root sequence used by another eNB. A Dv value of 1 may indicate that no overlap exists. The magnitude of Dv in the positive direction may indicate the gap between the last used logical root of the eNB 105-c and the root sequence assigned to the neighboring eNB. The magnitude of the Dv in the negative direction may indicate the amount of overlap of the last used logical root of the eNB 105-c and root sequences assigned to the neighboring eNB.

Figure 5:
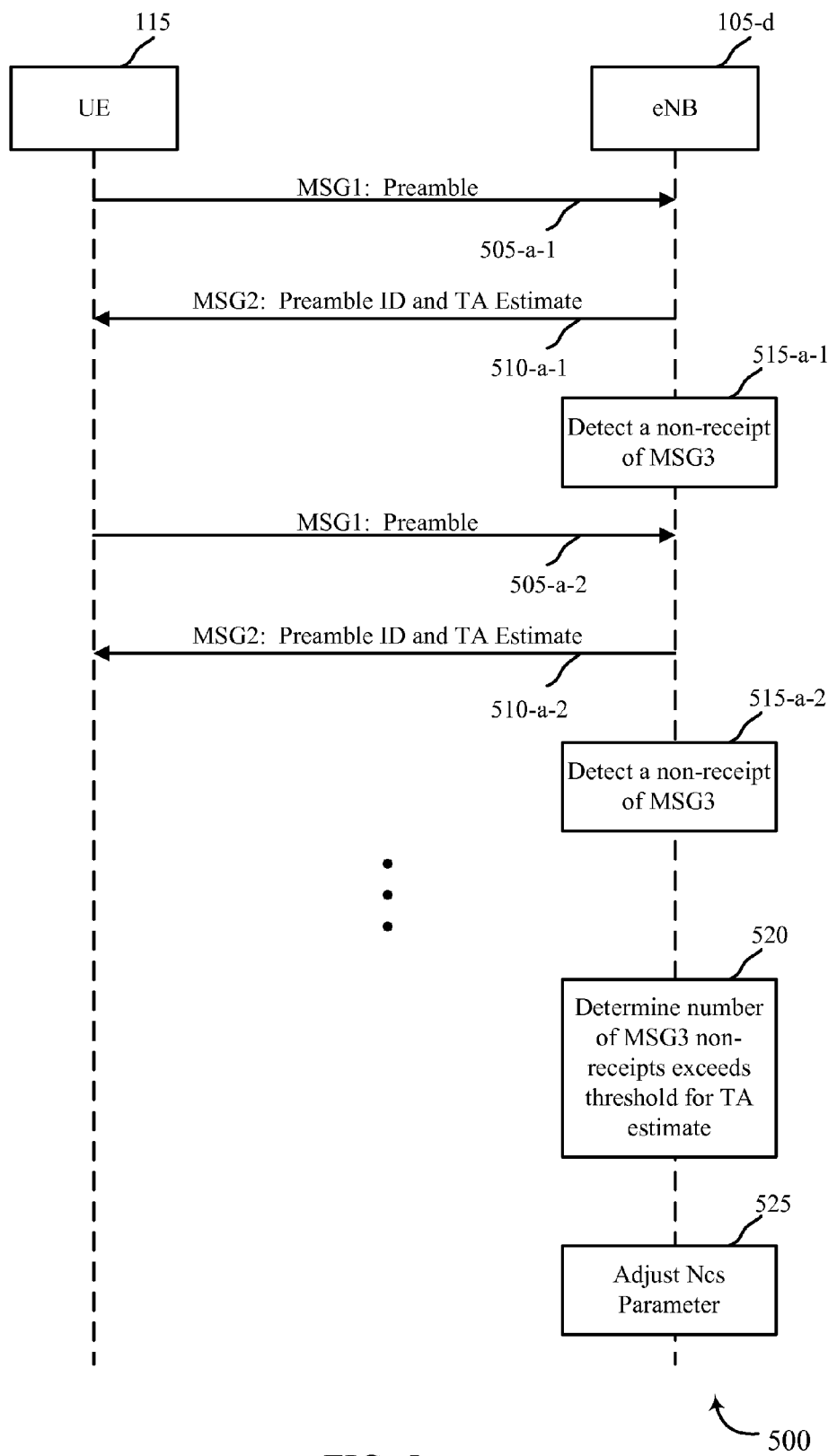
FIG. 5 is a message flow diagram of a connection setup procedure between an eNB and a user equipment (UE)

FIG. 5 is a message flow diagram 500 of a connection setup procedure between an eNB 105-d and a UE 115. The eNB 105-*d* may be an example of the eNB 105 of FIGS. 1, 2, 3, and/or 4. The UE 115 may be an example of the UE 115 of FIG. 1. The message flows may occur in a SON.

In LTE, the UE 115 may acquire initial timing synchronization by performing a RACH procedure. The UE 115 may transmit a first MSG1 preamble 505-*a*-1. The first MSG1 preamble may be derived from a Zadoff-Chu sequence. UE may discover available preambles to choose from based on a system information block (SIB) broadcasted in the cell of the eNB 105-*d*.

When the eNB 105-*d* detects the MSG1 preamble 505-*a*-1, it may estimate the UE's time advanced and the detected preamble ID. The eNB 105-*d* may respond to the UE 115 by transmitting a first MSG2 510-*a*-1. The first MSG2 may include the estimated TA value and the detected preamble ID. If the UE 115 is able to decode MSG2 correctly, it may use the TA estimation to adjust the timing of a MSG3. However, if the eNB 105-*d* incorrectly detected the preamble ID of the first MSG1 preamble 505-*a*-1, the eNB 105-*d* may communicate the non-matching preamble ID and wrong TA estimation to the UE 115. When the UE 115 decodes MSG2, it may either fail to match the preamble ID included in MSG2 with the one originally sent in MSG1. When this occurs, the UE 115 may not respond with the MSG3 and the eNB 105-*d* may detect 515-*a*-1 a non-receipt of MSG3.

When MSG3 is not received, this trial of the RACH procedure may be considered as a timing synchronization failure. If the preamble ID is incorrectly detected by the eNB 105-*d*, the estimation of the TA value may also be incorrect. If the UE 115 were to transmit MSG3 using the incorrect TA, MSG3 may not have the correct uplink timing adjustment and hence the uplink transmission to the eNB 105-*d* might fail. In one configuration, the eNB 105-*d* may record each detected preamble ID and the corresponding TA value. The eNB 105-*d* may also record whether each RACH trial passed or failed.

Using this information, the eNB 105-*d* may determine which range of TA values is experiencing a high failure rate, as well as the maximum cell range from which a UE 115 is attempting to send a MSG1. In one example, the eNB 105-*d* may determine 520 whether a number of MSG3 non-receipts (i.e., RACH trial failures, timing synchronization failures, etc.) exceed a threshold for a particular TA value or range of TA values. If the threshold is exceeded, the eNB 105-*d* may adjust 525 the Ncs parameter.

Figure 6:
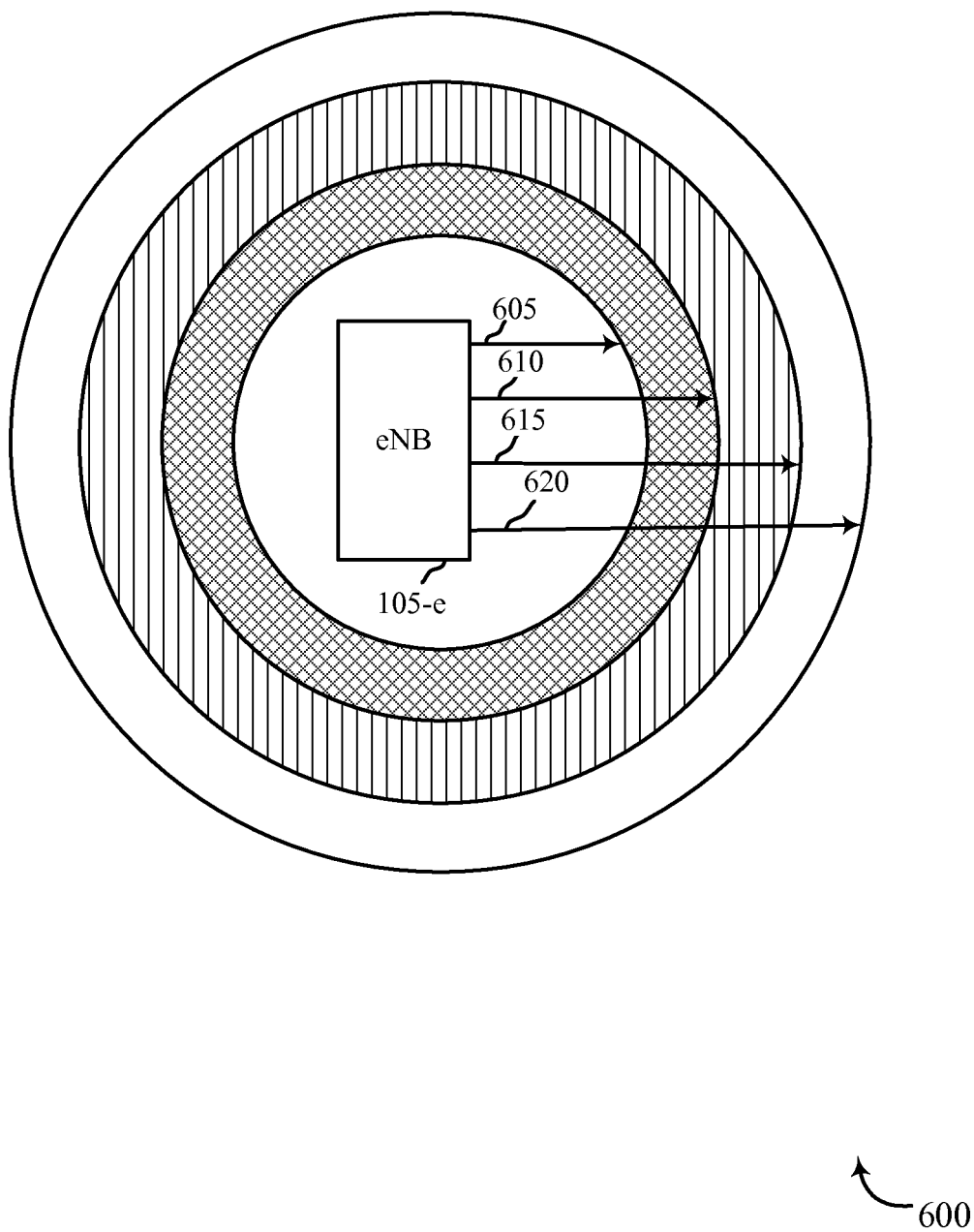
FIG. 6 is a block diagram illustrating one embodiment of a coverage area of a cell of an eNB.

FIG. 6 is a block diagram 600 illustrating one embodiment of a coverage area of a cell of an eNB 105-*e*. The eNB 105-*e* may be an example of the eNB 105 of FIGS. 1, 2, 3, 4, and/or 5. The eNB 105-*e* may support various coverage based on the Ncs parameter being implemented by the eNB 105-*e*. In one configuration, the current Ncs parameter may allow the eNB 105-*e* to support a first area 605, a second area 610, and a third area 615. The third area 615 may be the maximum distance supported by the current Ncs configuration at the eNB 105-*e*. The eNB 105-*e* may incorrectly detect preambles (e.g., MSG1 RACH preambles) that are transmitted at distances greater than the third area 615.

In one embodiment, the eNB 105-*e* may have a repeating observation period to detect PRACH preambles. The length of the observation period may be based on the coverage area of the eNB 105-*e* that is supported by the current Ncs configuration. The eNB 105-*e* may determine that preambles received closer to the start of the observation period were originated from UEs that are located close to the eNB 105-*e*, while preambles received closer to the end of the observation period were originated from UEs located at the edge of the cell's Ncs coverage area (e.g., at the edge of the third coverage area 615).

As an example, the eNB 105-*e* may have a repeating observation period of 2 microseconds. The eNB 105-*e* may estimate the TA value based on when a preamble is received during an observation period. Available preambles for UEs to choose from may include "12345", "51234", "45123", etc. A first UE may transmit a preamble (e.g., "12345") from the first coverage area 605. This close distance to the eNB 105-*e* may reduce the latency of the transmission. Thus, the entire preamble may be received at the eNB 105-*e* early on during the observation period. The eNB 105-*e* may compare the received preamble against reference codes. The eNB 105-*e* may determine that the preamble "12345" matches the reference code "12345", and may generate a preamble ID indicates that indicates the eNB 105-*e* received the preamble "12345". The eNB 105-*e* may also calculate the TA value for subsequent transmissions sent from the first UE. The TA value may be estimated based on when the preamble was received during the observation period.

A second UE may transmit a preamble (e.g., "51234") from the second coverage area 610. This preamble may be received later on during the observation window. Because the second UE is also located in the Ncs coverage area, the eNB 105-*e* may receive the entire preamble (e.g., 51234") during the observation period. The eNB 105-*e* may again compare this preamble against a set of reference codes and may determine that the preamble "51234" matches the reference code "51234". A preamble ID may be generated that informs the second UE that the eNB 105-*e* received the preamble "51234". The eNB 105-*e* may also calculate a different TA value for the second UE. The TA value may be different to account for the latency of the transmissions between the second UE and the eNB 105-*e*.

A third UE, which is out of the Ncs coverage area of the eNB 105-*e* (e.g., the UE 115 may be located beyond the third coverage area 615), may transmit a preamble ("45123") that is derived from a root sequence with a cyclic shift indicated by the current Ncs value. Because the third UE is out of the Ncs coverage area associated with the current Ncs value, the cyclic shift of the preamble may be too short. In this example, the eNB 105-*e* may receive the preamble 2.1 microseconds after it was transmitted from the UE. Thus, the preamble is not received during a first observation period of 2 microseconds, but is received 0.1 microseconds after a second observation period has begun. In one example, part of the preamble (e.g., "45") may be received at the end of the first observation period and the remaining portion of the preamble (e.g., "123") may be received at the beginning of the second observation period. The eNB 105-*e* may not use information that was received during previous observation period. Thus, from the view point of the eNB 105-*e*, it has received a preamble of "123" at the beginning of an observation period (the parts "45" of the preamble being received during the previous observation period.) The eNB 105-*e* may then compare reference codes against the received preamble "123". The eNB 105-*e* may determine that the received preamble of "123" closely matches the reference code "12345". As a result, the eNB 105-*e* may incorrectly conclude that the third UE transmitted the preamble "12345" and may generate a preamble ID that indicates to the third UE that the eNB 105-*e* believes it has received preamble "12345". Further, because the eNB 105-*e* believes the preamble was received at the beginning of an observation period (i.e., the second observation period), the eNB 105-*e* may calculate a TA value as if the third UE were located within the first coverage area 605. The TA value informs the UE how to adjust its timing for future transmissions on the uplink to the eNB 105-*e*.

The calculated preamble ID and TA value are transmitted back to the UE. The UE may analyze the preamble ID and determine that the preamble ID was incorrectly detected by the eNB 105-e. As a result, the UE may abort the transmission of a subsequent message. The eNB 105-e may detect the non-receipt of this subsequent message and may increase a counter of timing synchronization failures. The counter may indicate the number of failures (non-receipt of MSG3 from UE) that have occurred when the TA values suggest that the preambles originated from UE(s) located in, for example, the first coverage area 605. When the counter exceeds a threshold, the Ncs value of the eNB 105-e may be adjusted. In one example, if the eNB 105-e detects a high number of timing synchronization failures are occurring with TA values indicating the preambles were allegedly sent from UEs located nearby the eNB 105-e, the eNB 105-e may determine that the UEs that sent these preambles are actually located beyond the Ncs coverage area. As a result, the eNB 105-e may adjust the current Ncs parameter to increase the cyclic shift of the root sequences assigned to the eNB 105-e. Configuring Ncs to a higher value may allow the coverage area of the eNB 105-e to expand. This may, in turn, allow the UEs to perform successful RACH processes within the new Ncs value.

In one embodiment, if the eNB 105-e determines that a number of timing synchronization failures corresponding with a range of TA values for the first coverage area 605 does not exceed the threshold, the eNB 105-e may adjust the current Ncs parameter to a lower value in order to reduce the cyclic shift length applied to the base root sequences assigned to the eNB 105-e. Decreasing the cyclic shift may decrease the coverage area of the eNB 105-e supported by the Ncs configuration. The Ncs value may continue to be adjusted until the number of failures corresponding to the range of TA values for the first coverage area does exceed the threshold. When this occurs, the Ncs value may be adjusted to increase the coverage area and the eNB 105-e may use an optimal Ncs configuration.

Figure 7:
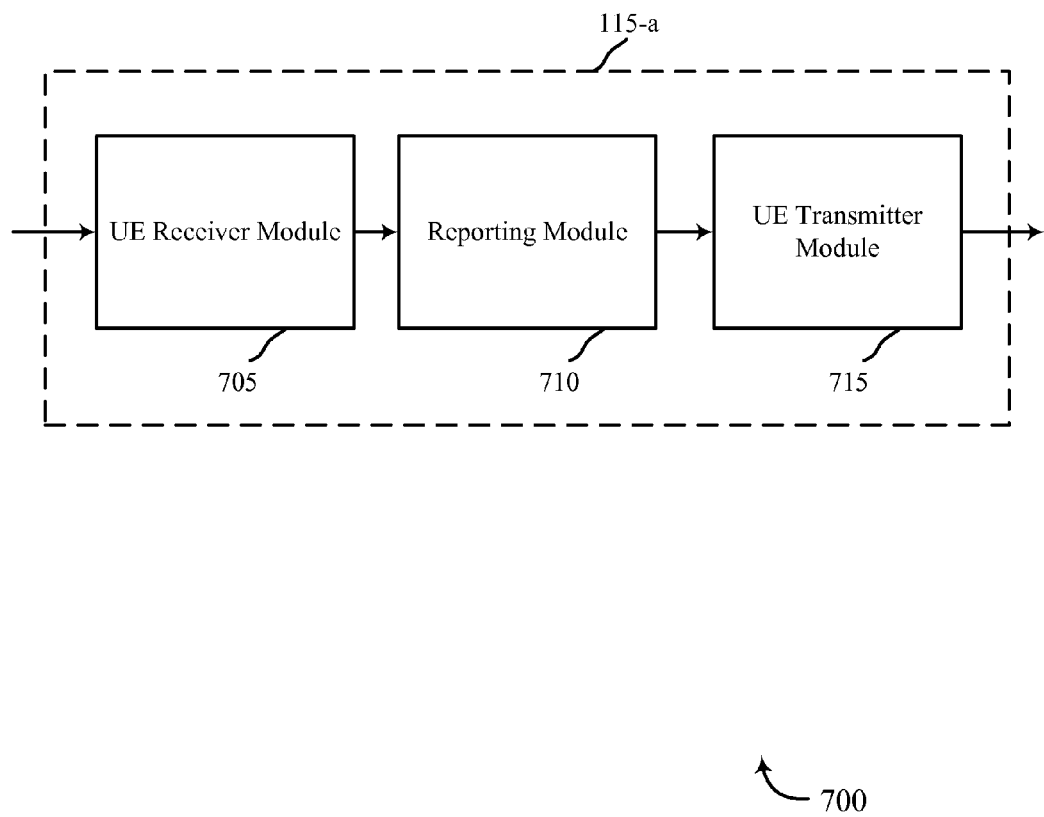
FIG. 7 is a block diagram illustrating one embodiment of a UE, in accordance with the present systems and methods.

FIG. 7 is a block diagram 700 illustrating one embodiment of a UE 115-a, in accordance with the present systems and methods. The UE 115-a may be an example of the UE 115 of FIGS. 1 and/or 5. The UE 115-a may include a UE receiver module 705, a reporting module 710, and a UE transmitter module 715. In one example, the UE 115-a may be part of a SON. Each of these components may be in communication with each other.

These components of the UE 115-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the UE receiver module 705 may receive communications from one or more other UEs and/or from one or more eNBs 105. The reporting module 710 may collect and report information indicating whether certain parameters of an eNB 105 should be adjusted. For example, the eNB 105-a may set initial parameters to use for wireless communications with the UEs 115. The reporting module 710 may gather various types of measurement information and communicate such information to the eNB 105 via the UE transmitter module 715. The eNB 105 may use the information to determine whether one or more of these parameters should be adjusted. Further details regarding the reporting module 710 of the UE 115-a will be described below.

Figure 8:
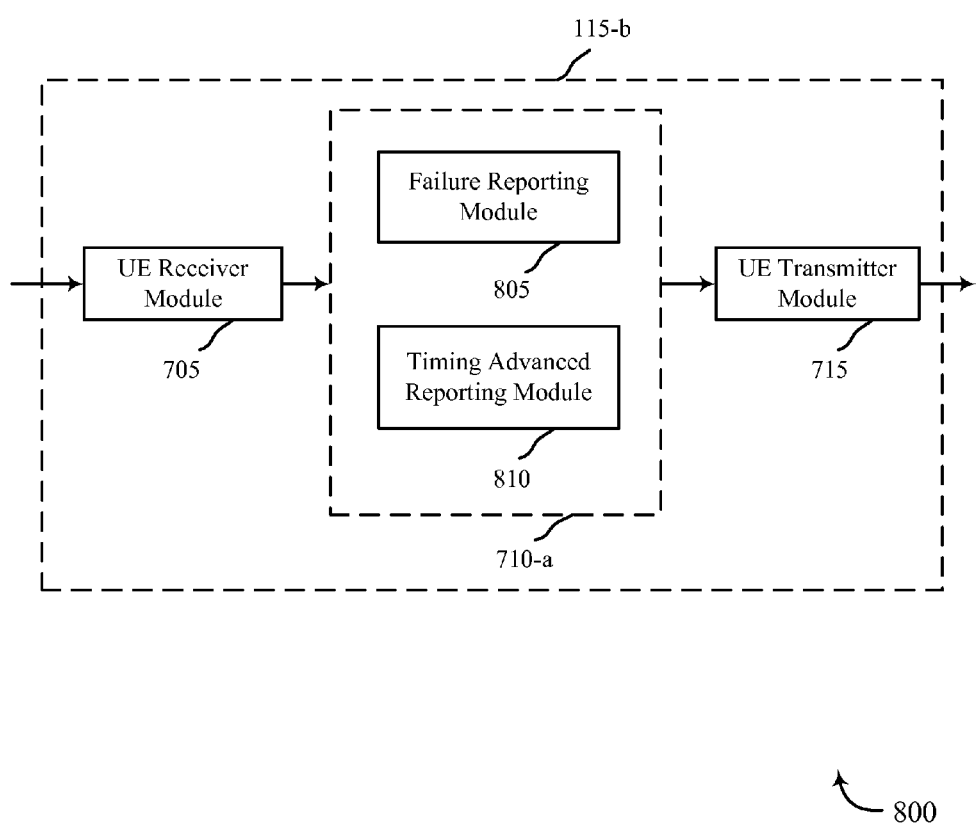
FIG. 8 is a block diagram illustrating a further embodiment of a UE, in accordance with the present systems and methods.

FIG. 8 is a block diagram 800 illustrating one embodiment of a UE 115-b, in accordance with the present systems and methods. The UE 115-b may be an example of the UE 115 of FIGS. 1, 5, and/or 7. The UE 115-b may include a UE receiver module 705, a reporting module 710-a, and a UE transmitter module 715. Each of these components may be in communication with each other.

These components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the reporting module 710-a may include a failure reporting module 805. The module 805 may maintain a log of timing synchronization failures that occur between the UE 115-b and an eNB 105 during a RACH procedure. The reporting module 710-a may also include a TA reporting module 810. The TA reporting module 810 may record the TA values received from the eNB 105 during a RACH trial. The reporting module 710-a may group together the logged timing synchronization failures with the corresponding TA value. The UE 115-b may generate a report indicating the number of failures and the corresponding TA values for each failure. The report may also indicate the number of successful RACH trials and the corresponding TA values. The report may be transmitted to the eNB 105 via the UE transmitter module 715.

Figure 9:
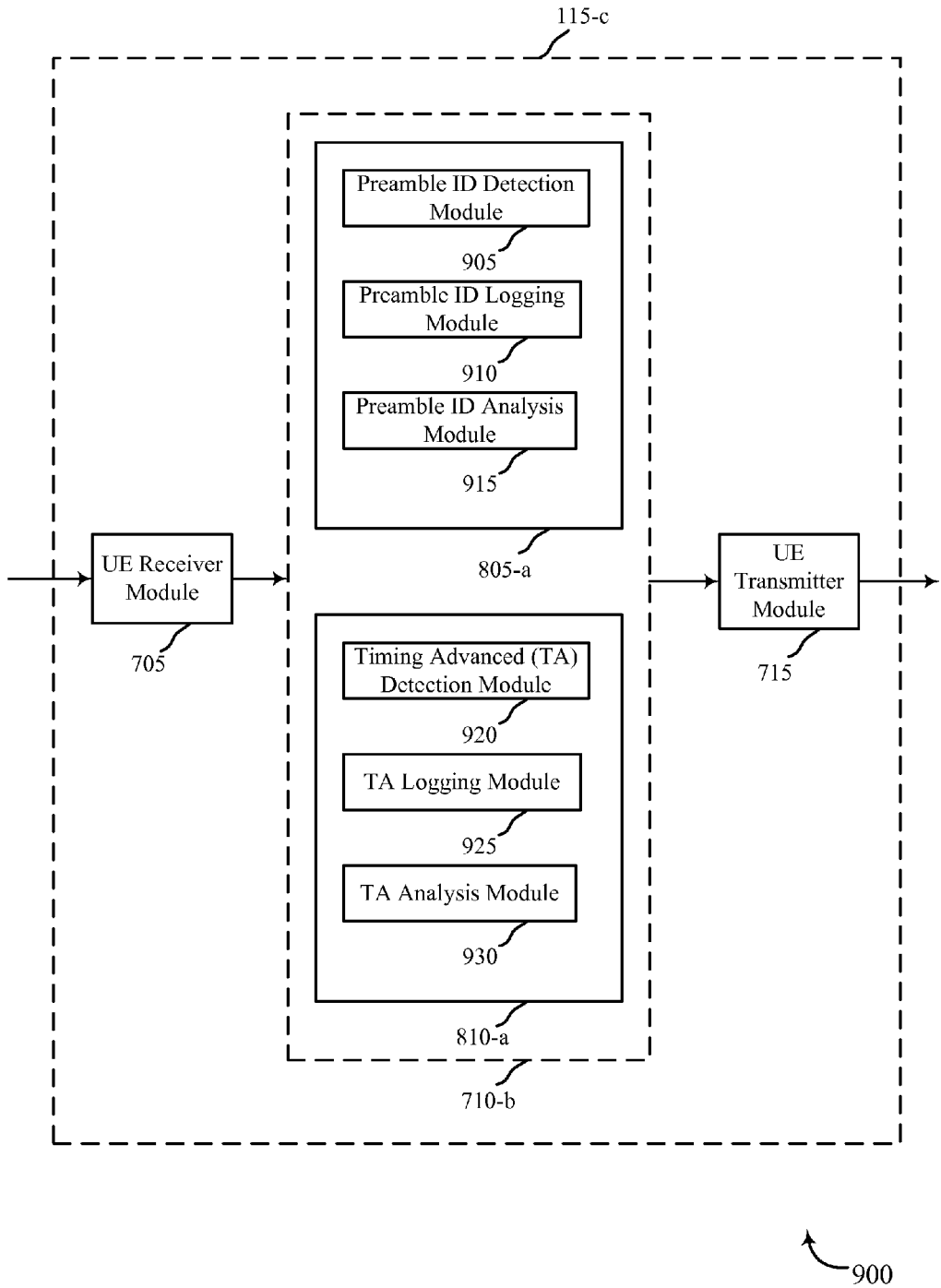
FIG. 9 is a block diagram illustrating an additional embodiment of a UE, in accordance with the present systems and methods.

FIG. 9 is a block diagram 900 illustrating one embodiment of a UE 115-c, in accordance with the present systems and methods. The UE 115-c may be an example of the UE 115 of FIGS. 1, 5, 7, and/or 8. The UE 115-c may include a UE receiver module 705, a reporting module 710-b, and a UE transmitter module 715. Each of these components may be in communication with each other.

These components of the UE 115-c may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the reporting module 710-b may include a failure reporting module 805-a. The module 805-a may include a preamble ID detection module 905, a preamble ID logging module 910, and a preamble ID analysis module 915. In one configuration, the preamble ID detection module 905 may detect the receipt of MSG2 from the eNB 105. The MSG2 may include the preamble ID sent from the eNB 105. As previously explained, the preamble ID may indicate the preamble the eNB 105 determined was transmitted from the UE 115-c as MSG1. The preamble ID logging module 910 may log the detected preamble IDs. In one embodiment, the preamble ID analysis module 915 may determine whether the detected preamble ID correctly identifies the preamble that was transmitted as MSG1.

The reporting module 710-b may also include a TA reporting module 810-a. The TA reporting module 810-a may include a TA detection module 920, a TA logging module 925, and a TA analysis module 930. In one example, the TA detection module 920 may detect the TA value that is received from the eNB 105 as part of MSG2. The TA logging module 925 may log the detected TA values. In one example, the TA values may be logged with the corresponding preamble ID that was received as part of the same MSG2 from the eNB 105. The TA analysis module 930 may analyze the detected TA values to determine a number of TA values representing coverage areas near the eNB 105. For the example, the analysis module 930 may identify the TA values corresponding to the first coverage area 605 of the eNB 105.

In one embodiment, the reporting module 710-b may transmit a report to the eNB 105. The report may include information indicating the number of timing synchronization failures (e.g., the number of occurrences when the UE 115-c did not transmit a MSG3 upon receipt of the preamble ID). The report may also indicate the number of failures that occurred within a certain Ncs coverage area of the eNB 105. In one embodiment, the UE 115-c may analyze the report data to determine whether the eNB 105 should adjust its Ncs parameter. In another embodiment, the UE 115-c may transmit the report and the eNB 105 may perform the processing of the report to determine whether it should change its Ncs parameter. The report may be sent passively to the eNB 105 (e.g., transmit the report according to a timing cycle). The report may also be sent actively to the eNB 105 when the UE 115-c receives a request to transmit the report from the eNB 105. In one configuration, the report may be transmitted via the UE transmitter module 715.

The module 805 may maintain a log of timing synchronization failures that occur between the UE 115-b and an eNB 105 during a RACH procedure. The reporting module 710-a may also include a TA reporting module 810. The TA reporting module 810 may record the TA values received from the eNB 105 during a RACH trial. The reporting module 710-a may group together the logged timing synchronization failures with the corresponding TA value. The UE 115-b may generate a report indicating the number of failures and the corresponding TA values for each failure. The report may also indicate the number of successful RACH trials and the corresponding TA values. The report may be transmitted to the eNB 105 via the UE transmitter module 715.

Figure 10:
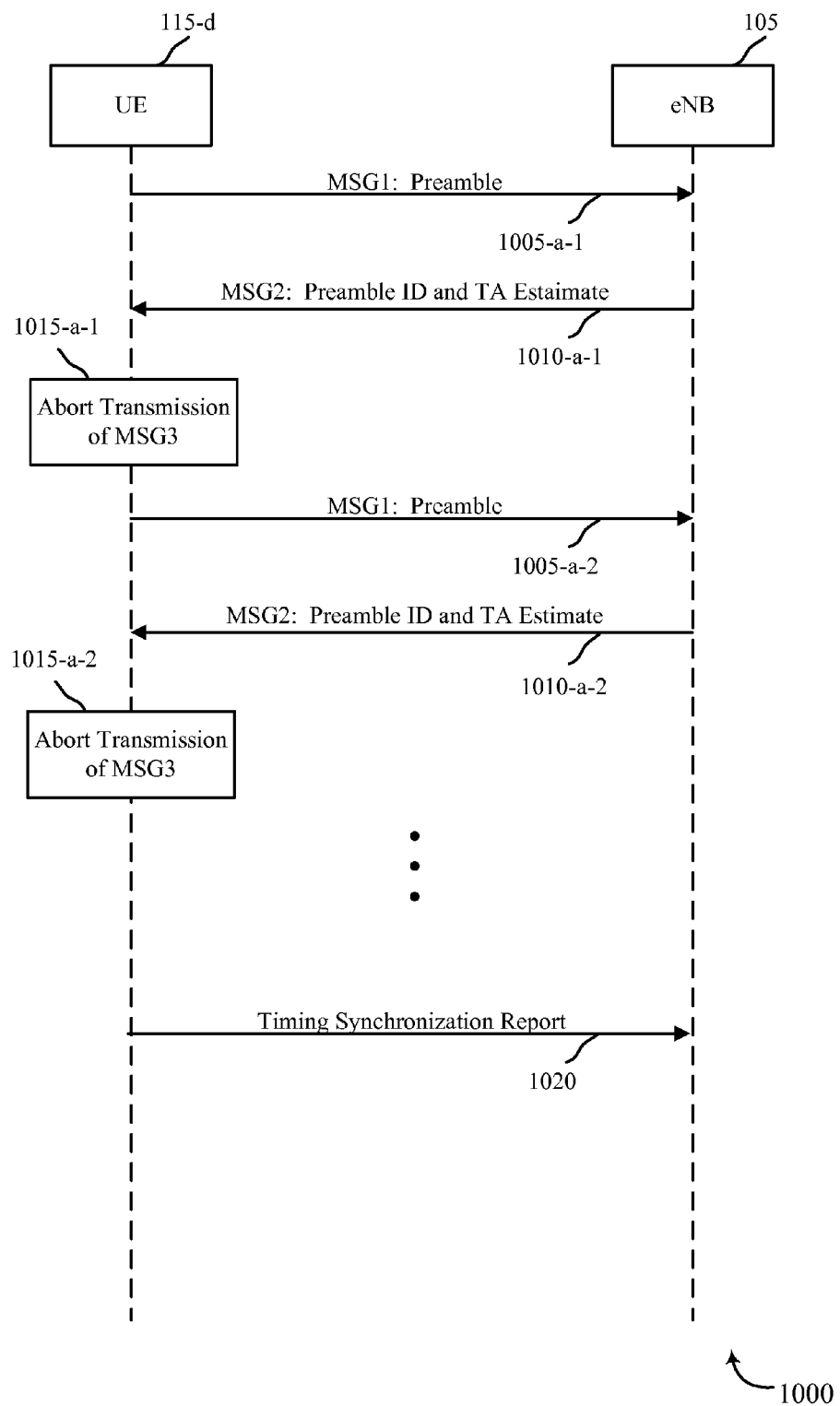
FIG. 10 is a message flow diagram of a connection setup procedure between a UE and an eNB.

FIG. 10 is a message flow diagram 1000 of a connection setup procedure between a UE 115-d and an eNB 105. The UE 115-d may be an example of the UE of FIGS. 1, 5, 7, 8, and/or 9. The eNB 105 may be an example of the eNB 105 of FIGS. 1, 2, 3, 4, 5, and/or 6.

In one configuration, the UE 115-d may transmit a first MSG1 1005-a-1 to the eNB 105. MSG1 may include a preamble, such as a PRACH preamble to initialize the connection setup procedure. The eNB 105 may respond with a first MSG2 1010-a-1 that includes a preamble ID for the received preamble and a TA estimation. The UE 115-d may be unable to correctly decode MSG2 because the preamble ID was incorrectly detected by the eNB 105. As a result, the UE 115-d may abort 1015-a-1 the transmission of MSG3 to the eNB 105. This process may continue and the UE 115-d may continue to abort MSG3 transmissions if it is unable to decode MSG2 received from the eNB 105. In one embodiment, the UE 115-d may transmit a timing synchronization report 1020 to the eNB 105. The report 1020 may include a log of the MSG1 preambles and the corresponding MSG2 preamble IDs. The report 1020 may further include a log of the TA estimations corresponding to each MSG2 preamble ID. Further, the report may indicate whether each particular MSG1/MSG2 pair resulted in a timing synchronization failure (e.g., non-transmission of MSG3). The report 1020 may also include an indication as to whether the eNB 105 should adjust its Ncs value. For example, the report may include one or more bits indicating to the eNB 105 that the Ncs parameter should be adjusted. In another embodiment, the report 1020 may include the information and the eNB 105 may process to information to determine whether to modify its current Ncs configuration.

Figure 11:
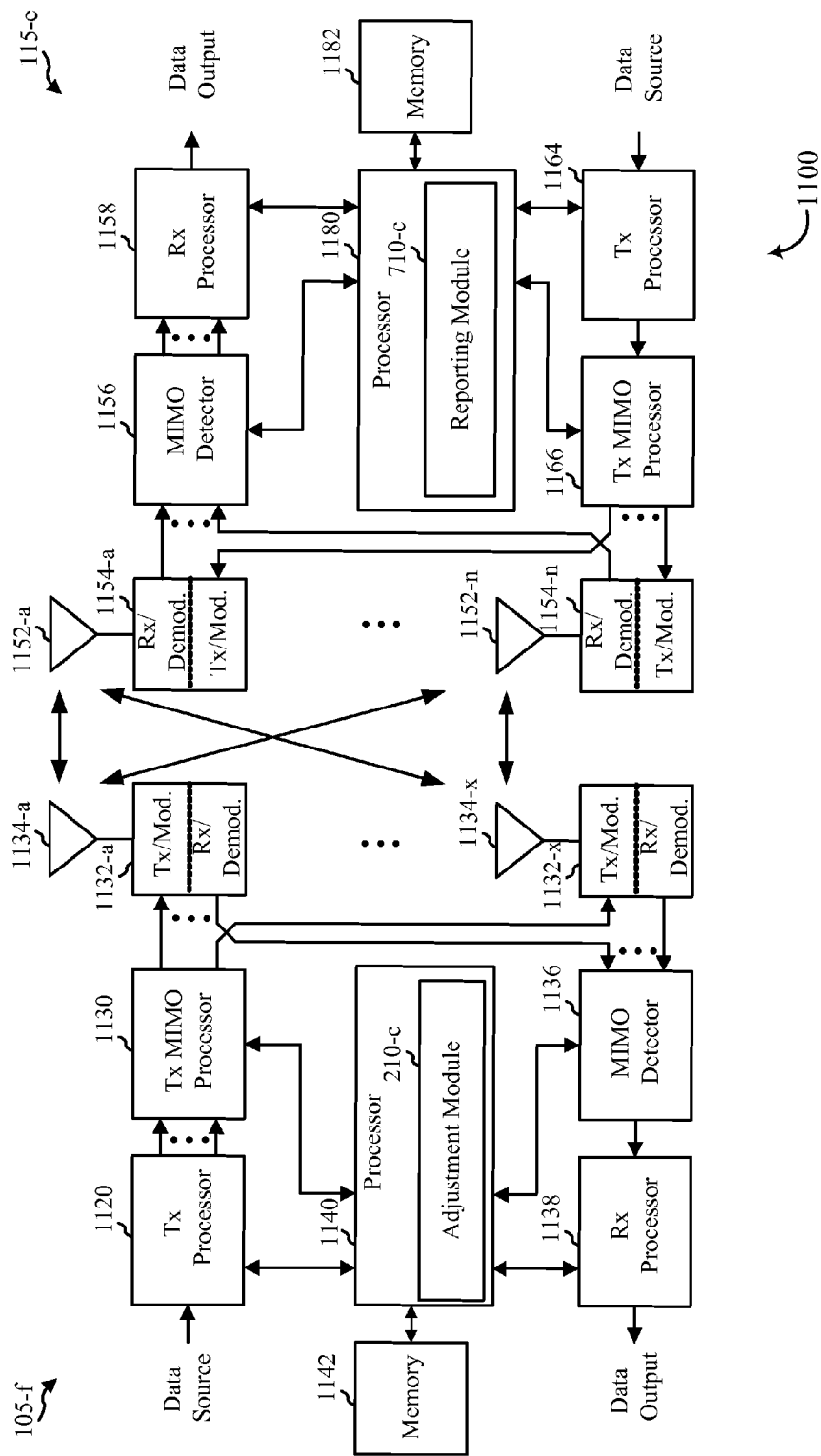
FIG. 11 is a block diagram of a multiple-input multiple-output (MIMO) communication system including an eNB and an UE.

FIG. 11 is a block diagram of a MIMO communication system 1100 including an eNB 105-f and an UE 115-e. This system 1100 may illustrate aspects of the system 100 of FIG. 1. The eNB 105-f may be an example of the eNB 105 of FIGS. 1, 2, 3, 4, 5, 6, and/or 10. The UE 115-e may be an example of the UE 115 of FIGS. 1, 5, 7, 8, 9, and/or 10. The eNB 105-f may be equipped with antennas 1134-a through 1134-x, and the UE 115-e may be equipped with antennas 1152-a through 1152-n. In the system 1100, the eNB 105-f may be able to send data over multiple communication links at the same time. Each communication link may be called a "layer" and the "rank" of the communication link may indicate the number of layers used for communication. For example, in a 2×2 MIMO system where eNB 105-f transmits two "layers," the rank of the communication link between the eNB 105-f and the UE 115-e is two.

At the eNB 105-f, a transmit processor 1120 may receive data from a data source. The transmit processor 1120 may process the data. The transmit processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the transmit modulators 1132-a through 1132-x. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. In one example, downlink signals from modulators 1132-a through 1132-x may be transmitted via the antennas 1134-a through 1134-x, respectively.

At the UE 115-e, the UE antennas 1152-a through 1152-n may receive the downlink signals from the eNB 105-f and may provide the received signals to the demodulators 1154-a through 1154-n, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-a through 1154-n, perform MIMO detection on the received symbols if applicable, and provide detected symbols. A receive processor 1158 may process (e.g., demodulate, deinterleave, and decode) the detected symbols, providing decoded data for the UE 115-e to a data output, and provide decoded control information to a processor 1180, or memory 1182. In one embodiment, the processor 1180 may include a reporting module 710-c to implement the systems and methods described herein. The reporting module 710-c may be examples of the module 710 of FIGS. 7, 8, and/or 9.

On the uplink, at the UE 115-e, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the demodulators 1154-a through 1154-n (e.g., for SC-FDMA, etc.), and be transmitted to the eNB 105-f in accordance with the transmission parameters received from the eNB 105-e. At the eNB 105-f, the uplink signals from the UE 115-e may be received by the antennas 1134, processed by the demodulators 1132, detected by a MIMO detector 1136 if applicable, and further processed by a receive processor. The receive processor 1138 may provide decoded data to a data output and to the processor 1140. The processor 1140 may include an adjustment module 210-c to implement the systems and methods described herein. The module 210-c may be an example of the adjustment module 210 of FIGS. 2, 3, and/or 4. The components of the UE 115-e may, individually or collectively, be implemented with one or more Application Specific Integrated Circuits (ASICs) adapted to perform some or all of the applicable functions in hardware. Each of the noted modules may be a means for performing one or more functions related to operation of the system 1100.

Similarly, the components of the eNB 105-f may, individually or collectively, be implemented with one or more Application Specific Integrated Circuits (ASICs) adapted to perform some or all of the applicable functions in hardware. Each of the noted components may be a means for performing one or more functions related to operation of the system 1100.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. At the Physical layer, the transport channels may be mapped to Physical channels.

Figure 12:
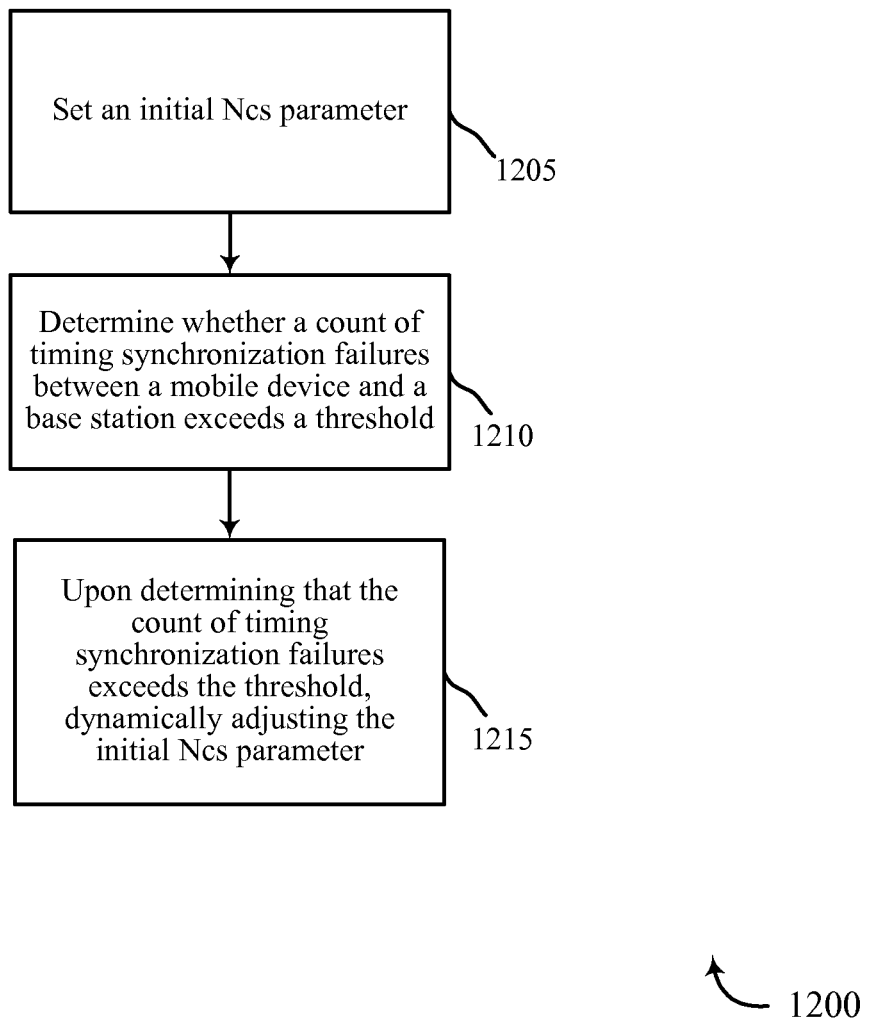
FIG. 12 is a flow chart illustrating one embodiment of a method for adjusting an Ncs parameter.

FIG. 12 is a flow chart illustrating one embodiment of a method 1200 for adjusting an Ncs parameter. For clarity, the method 1200 is described below with reference to the eNB 105 of FIGS. 1, 2, 3, 4, 5, 6, 10 and/or 11. In one implementation, the adjustment module 210 of FIGS. 2, 3, 4, and/or 11 may execute one or more sets of codes to control the functional elements of the eNB 105 to perform the functions described below.

At block 1205, an initial Ncs parameter may be set. At block 1210, a determination may be made as to whether a count of timing synchronization failures between a mobile device (e.g., a UE 115) and a base station (e.g., an eNB 105) exceed a threshold. Upon determining that the count of timing synchronization failures exceeds the threshold, at block 1215, the initial Ncs parameter may be dynamically adjusted.

Therefore, the method 1200 may provide for dynamically adjusting an initial Ncs value based on a number of timing synchronization failures that occur between the UE 115 and the eNB 105. It should be noted that the method 1200 is just one implementation and that the operations of the method 1200 may be rearranged or otherwise modified such that other implementations are possible.

Figure 13:
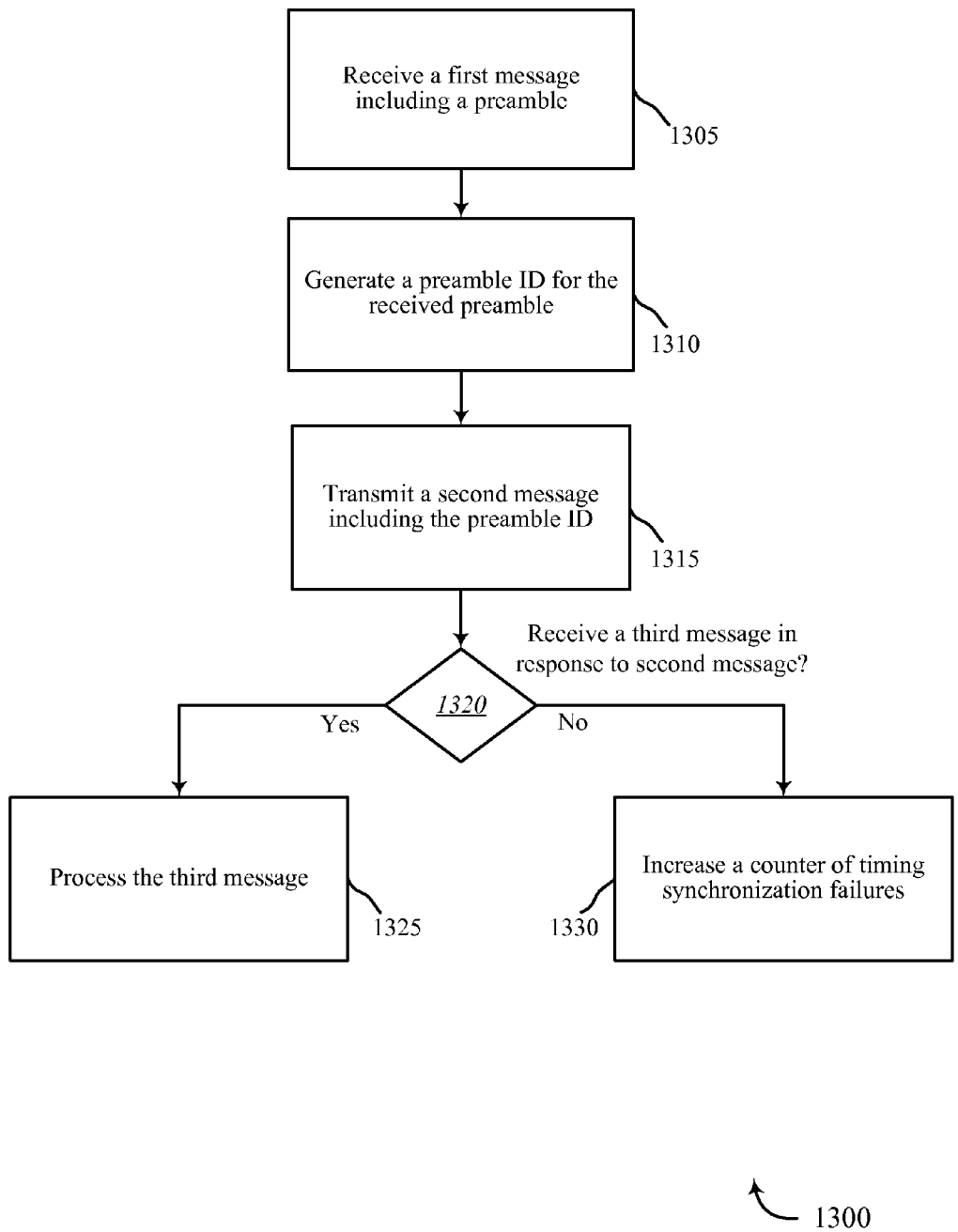
FIG. 13 is a flow chart illustrating one embodiment of a method for maintaining a counter of timing synchronization failures to determine whether to adjust an Ncs parameter.

FIG. 13 is a flow chart illustrating one embodiment of a method 1300 for maintaining a counter of timing synchronization failures to determine whether to adjust an Ncs parameter. For clarity, the method 1300 is described below with reference to the eNB 105 of FIGS. 1, 2, 3, 4, 5, 6, 10 and/or 11. In one implementation, the adjustment module 210 of FIGS. 2, 3, 4, and/or 11 may execute one or more sets of codes to control the functional elements of the eNB 105 to perform the functions described below.

At block 1305, a first message including a preamble may be received. The preamble may be a PRACH preamble used to initialize a RACH procedure. At block 1310, a preamble ID may be generated for the received preamble. The preamble ID may be generated by comparing the received preamble with one or more reference codes. The reference code that matches the received preamble with a certain degree of accuracy may be used as the preamble ID. At block 1315, a second message may be transmitted that includes the preamble ID. At block 1320, a determination may be made as to whether a third message is received in response to the second message. If it is determined that the third message is received, the third message may be processed at block 1325. If, however, it is determined that the third message is not received, a counter of timing synchronization failures may be increased 1330.

Therefore, the method 1300 may provide for maintaining a counter of timing failures that occur between the UE 115 and the eNB 105. It should be noted that the method 1300 is just one implementation and that the operations of the method 1300 may be rearranged or otherwise modified such that other implementations are possible.

Figure 14:
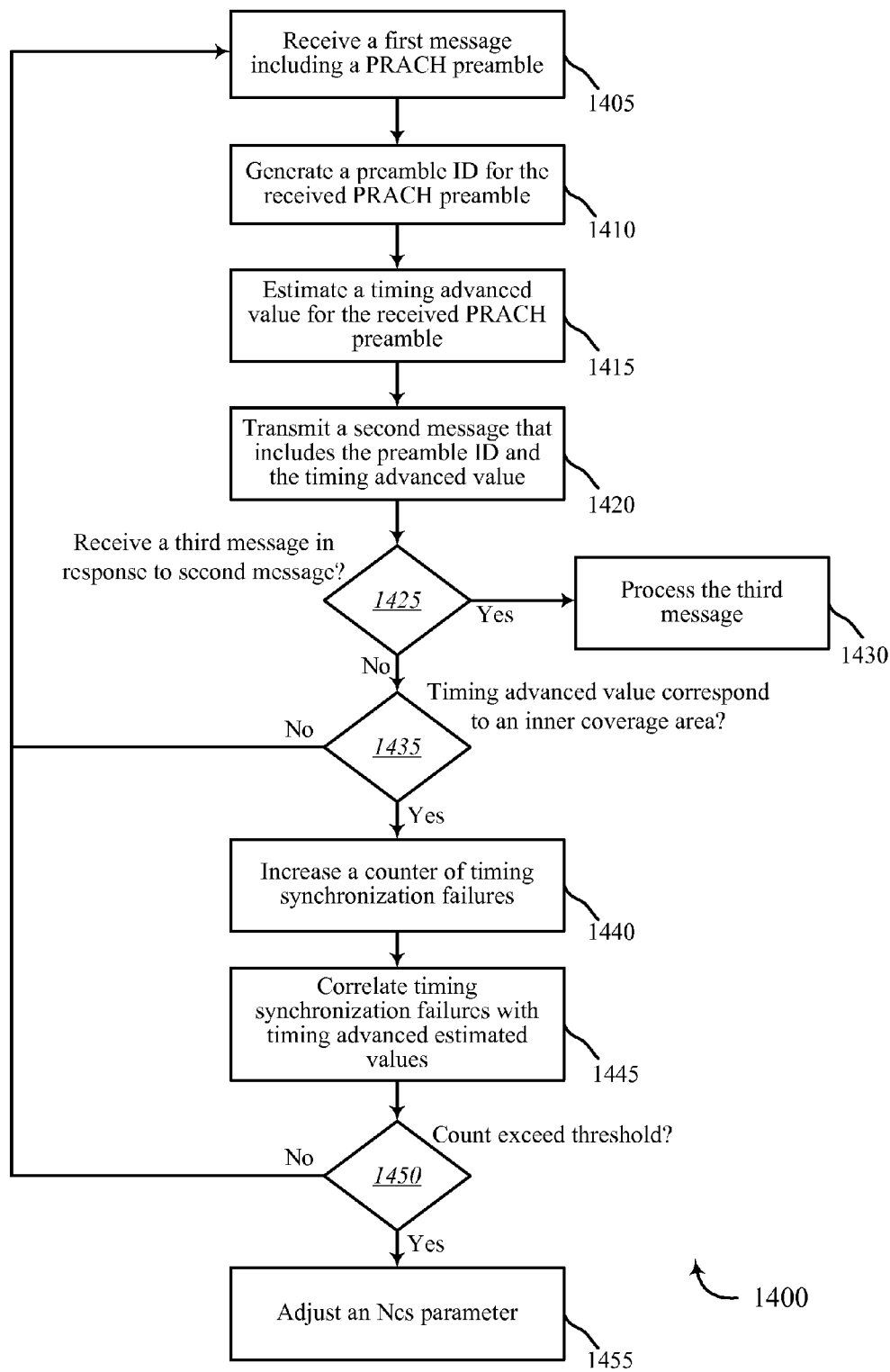
FIG. 14 is a is a flow chart illustrating one embodiment of a method for adjusting an Ncs parameter based on a number of timing synchronization failures that occur within a certain Ncs coverage area of an eNB.

FIG. 14 is a flow chart illustrating one embodiment of a method 1400 for adjusting an Ncs parameter based on a number of timing synchronization failures that occur within a certain Ncs coverage area of an eNB 105. For clarity, the method 1400 is described below with reference to the eNB 105 of FIGS. 1, 2, 3, 4, 5, 6, 10 and/or 11. In one implementation, the adjustment module 210 of FIGS. 2, 3, 4, and/or 11 may execute one or more sets of codes to control the functional elements of the eNB 105 to perform the functions described below.

At block 1405, a first message including a PRACH preamble may be received. At block 1410, a preamble ID for the received PRACH preamble may be generated. At block 1415, a TA value may be estimated for the received PRACH preamble. The TA value may be generated by the eNB 105 to indicate to the UE 115 how to adjust its uplink timing for subsequent messages. Thus, the TA value indicates where the eNB 105 believes the UE 115 to be located within the Ncs coverage area.

At block 1425, a determination may be made as to whether a third message is received in response to the second message. If it is determined that the third message is received, the third message may be processed at block 1430. If, however, it is determined that the third message is not received, a determination 1435 may be made as to whether the TA value corresponds to an inner coverage area of the Ncs coverage area (e.g., the first coverage area 605). If it is determined that the TA value does not correspond to the inner coverage area, the method 1400 may return to receive a first message with a PRACH preamble at block 1405. If, however, it is determined that the TA value does correspond to the inner coverage area, at block 1440, a counter of timing synchronization failures may be increased. At block 1445, timing synchronization failures (i.e., communication failures) may be correlated with TA estimated values. In one example, communication failures may be classified into a range of estimated TA values. As a result, the eNB 105 may determine the number of communication failures that have occurred for any range of TA estimated values. A determination 1450 may be made as to whether the count of failures exceeds a threshold. If it is determined that the count does not exceed the threshold, the method 1400 may return to receive a first message with a PRACH preamble at block 1405. If, however, it is determined that the count of timing synchronization failures does exceed the threshold, at block 1455, an Ncs parameter may be adjusted.

Therefore, the method 1400 may provide for adjusting an Ncs parameter based on a number of timing synchronization failures that occur within a certain Ncs coverage area of an eNB 105. It should be noted that the method 1400 is just one implementation and that the operations of the method 1400 may be rearranged or otherwise modified such that other implementations are possible.

Figure 15:
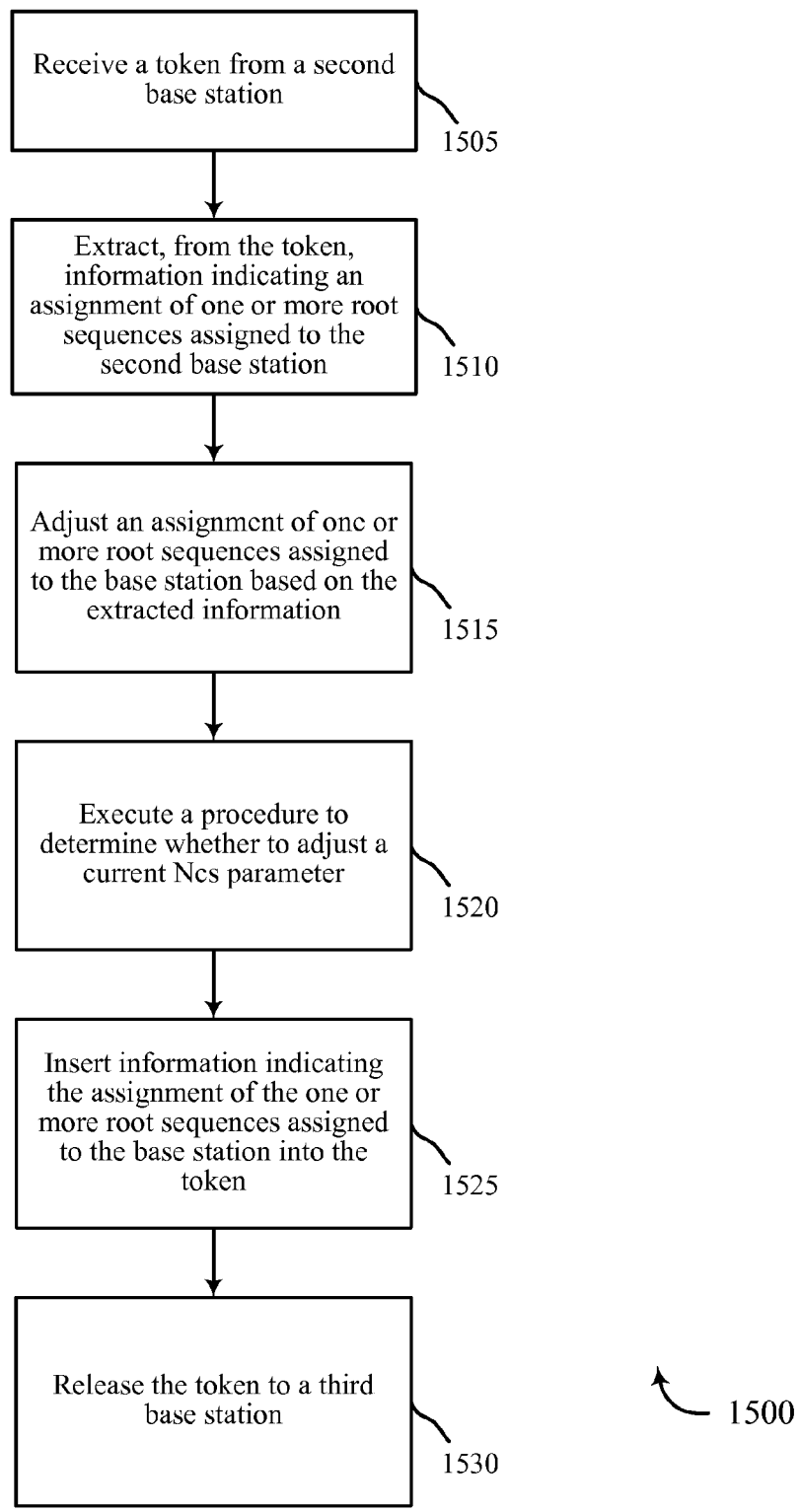
FIG. 15 is a is a flow chart illustrating one embodiment of a method for dynamically adjusting an assignment of root sequences used to derive preambles across a plurality of eNBs.

FIG. 15 is a flow chart illustrating one embodiment of a method 1500 for dynamically adjusting an assignment of root sequences used to derive preambles across a plurality of eNBs 105. For clarity, the method 1500 is described below with reference to the eNB 105 of FIGS. 1, 2, 3, 4, 5, 6, 10 and/or 11. In one implementation, the adjustment module 210 of FIGS. 2, 3, 4, and/or 11 may execute one or more sets of codes to control the functional elements of the eNB 105 to perform the functions described below.

At block 1505, a token may be received from a second eNB (i.e., base station). At block 1510, information may be extracted from the token. The information may indicate an assignment of one or more root sequences assigned to the second eNB. At block 1515, an assignment of one or more root sequences assigned to the eNB may be adjusted based on the extracted information. At block 1520, a procedure to determine whether to adjust a current Ncs configuration of the eNB may be executed. If the Ncs is adjusted, the root sequence assignment may be further adjusted. At block 1525, information may be inserted into the token. The information may indicate the assignment of the one or more root sequences assigned to the eNB. At block 1530, the token may be released to a third eNB.

Therefore, the method 1500 may provide for dynamically adjusting an assignment of root sequences used to derive preambles across a plurality of eNBs 105. It should be noted that the method 1500 is just one implementation and that the operations of the method 1500 may be rearranged or otherwise modified such that other implementations are possible.

Figure 16:
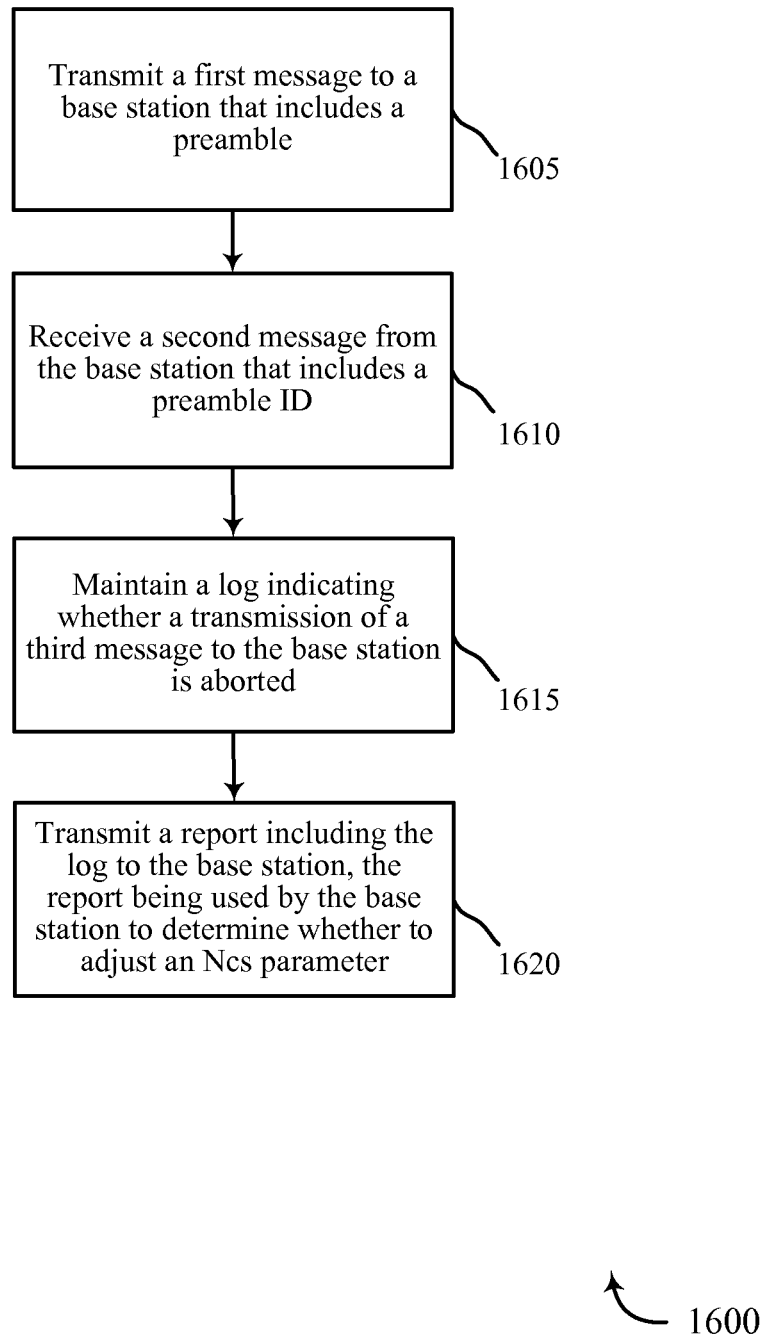
FIG. 16 is a flow chart illustrating one embodiment of a method for maintaining a log of timing synchronization failures to report to an eNB.

FIG. 16 is a flow chart illustrating one embodiment of a method 1600 for maintaining a log of timing synchronization failures to report to an eNB 105. For clarity, the method 1600 is described below with reference to the UE 115 of FIGS. 1, 5, 7, 8, 9, 10 and/or 11. In one implementation, the reporting module 710 of FIGS. 7, 8, 9, and/or 10 may execute one or more sets of codes to control the functional elements of the UE 115 to perform the functions described below.

At block 1605, a first message may be transmitted to an eNB that includes a preamble. At block 1610, a second message may be received from the eNB that includes a preamble ID. At block 1615, a log may be maintained that indicates whether a transmission of a third message to the eNB is aborted. At block 1620, a report may be transmitted to the eNB. The report may include a log of timing synchronization failures. The report may be used by the eNB to determine whether to adjust an Ncs parameter.

Therefore, the method 1600 may provide for maintaining a log of timing synchronization failures to report to an eNB 105. It should be noted that the method 1600 is just one implementation and that the operations of the method 1600 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method to adjust a ZeroCorrelationZoneConfig (Ncs) parameter of a base station, comprising:
    setting an initial Ncs parameter,
    determining a count of timing synchronization failures between a mobile device and the base station, and
    upon determining that the count of timing synchronization failures exceeds a threshold, dynamically adjusting the initial Ncs parameter.

2. The method of claim 1, further comprising:
    detecting an occurrence of a timing synchronization failure.

3. The method of claim 2, wherein detecting the occurrence of the timing synchronization failure comprises:
    receiving a first message comprising a preamble,
    generating a preamble identification (ID) for the received preamble,
    transmitting a second message comprising the preamble ID, and
    upon transmission of the second message, detecting a non-receipt of a third message.

4. The method of claim 2, wherein detecting the occurrence of the timing synchronization failure comprises:
    receiving a first message comprising a physical random access channel (PRACH) preamble,
    generating preamble identification (ID) for the received PRACH preamble,
    transmitting a second message comprising the preamble ID, and
    upon transmission of the second message, detecting a non-receipt of a third message in response to the second message.

5. The method of claim 4, further comprising:
    estimating a timing advanced value for the received PRACH preamble, the timing advanced value indicating a first coverage area of the base station, and
    maintaining a count of timing synchronization failures that occur in the first coverage area of the base station.

6. The method of claim 1, further comprising:
    inserting information indicating an assignment of one or more root sequences assigned to the base station into a token, the one or more root sequences being used to generate a physical random access channel (PRACH) preamble, and
    releasing the token to a second base station.

7. The method of claim 1, further comprising:
    receiving a token from a second base station,
    extracting, from the received token, information indicating an assignment of one or more root sequences assigned to the second base station, the one or more root sequences being used to generate a physical random access channel (PRACH) preamble, and
    adjusting an assignment of one or more root sequences assigned to the base station based on the extracted information.

8. The method of claim 7, wherein the token triggers the base station to determine whether to adjust a current Ncs parameter of the base station.

9. The method of claim 1, further comprising:
    coordinating assignments of root sequences among a plurality of base stations, the root sequences being used to generate physical random access channel (PRACH) preambles.

10. The method of claim 9, wherein coordinating the assignments of the root sequences comprises:
    receiving instructions from a centralized server to determine whether to adjust one or more root sequences currently assigned to the base station.

11. The method of claim 9, wherein coordinating the assignments of the root sequences comprises:
    receiving a token from one of the plurality of base stations, the token triggering the base station to determine whether to adjust one or more root sequences currently assigned to the base station.

12. The method of claim 1, wherein upon determining that the count of communication failures fails to exceed the threshold, reducing the Ncs parameter.

13. A base station configured to adjust a ZeroCorrelationZoneConfig (Ncs) parameter, comprising:
a processor; and
a memory in electronic communication with the processor, the memory embodying instructions, the instructions being executable by the process to:
set an initial Ncs parameter,
determine a count of timing synchronization failures between a mobile device and the base station, and
upon determining that the count of timing synchronization failures exceeds a threshold, dynamically adjusting the initial Ncs parameter.

14. The base station of claim 13, wherein the instructions are executable by the processor to:
detect an occurrence of a timing synchronization failure.

15. The base station of claim 14, wherein the instructions to detect the occurrence of the timing synchronization failure are executable by the processor to:
receive a first message comprising a preamble,
generate a preamble identification (ID) for the received preamble,
transmit a second message comprising the preamble ID, and
upon transmission of the second message, detect a non-receipt of a third message.

16. The base station of claim 14, wherein the instructions to detect the occurrence of the timing synchronization failure are executable by the processor to:
receive a first message comprising a physical random access channel (PRACH) preamble,
generate preamble identification (ID) for the received PRACH preamble,
transmit a second message comprising the preamble ID, and
upon transmission of the second message, detect a non-receipt of a third message in response to the second message.

17. The base station of claim 16, wherein the instructions are executable by the processor to:
estimate a timing value for the detected preamble, the timing value indicating a particular coverage area of the base station, and
maintain a count of detected PRACH preambles with the estimated timing value that result in a communication failure.

18. The base station of claim 13, wherein the instructions are executable by the processor to:
insert information indicating an assignment of one or more root sequences assigned to the base station into a token, the one or more root sequences being used to generate a physical random access channel (PRACH) preamble, and
release the token to a second base station.

19. The base station of claim 13, wherein the instructions are executable by the processor to:
receive a token from a second base station,
extract, from the received token, information indicating an assignment of one or more root sequences assigned to the second base station, the one or more root sequences being used to generate a physical random access channel (PRACH) preamble, and
adjust an assignment of one or more root sequences assigned to the base station based on the extracted information.

20. The base station of claim 19, wherein the token triggers the base station to determine whether to adjust a current Ncs parameter of the base station.

21. The base station of claim 13, wherein the instructions are executable by the processor to:
coordinate assignments of root sequences among a plurality of base stations, the root sequences being used to generate physical random access channel (PRACH) preambles.

22. The base station of claim 21, wherein the instructions to coordinate the assignments of the root sequences are executable by the processor to:
receive instructions from a centralized server to determine whether to adjust one or more root sequences currently assigned to the base station.

23. The base station of claim 21, wherein the instructions to coordinate the assignments of the root sequences are executable by the processor to:
receive a token from one of the plurality of base stations, the token triggering the base station to determine whether to adjust one or more root sequences currently assigned to the base station.

24. The base station of claim 13, wherein upon determining that the count of communication failures fails to exceed the threshold, the instructions are executable by the processor to:
reduce the Ncs parameter.

25. An apparatus to adjust a ZeroCorrelationZoneConfig (Ncs) parameter, comprising:
means for setting an initial Ncs parameter;
means for determining a count of timing synchronization failures between a mobile device and a base station; and
means for dynamically adjusting the initial Ncs parameter upon determining that the count of timing synchronization failures exceeds a threshold.

26. The apparatus of claim 25, further comprising:
means for detecting an occurrence of a timing synchronization failure.

27. The apparatus of claim 26, wherein the means for detecting the occurrence of the timing synchronization failure comprises:
means for receiving a first message comprising a physical random access channel (PRACH) preamble;
means for generating preamble identification (ID) for the received PRACH preamble;
means for transmitting a second message comprising the preamble ID; and
upon transmission of the second message, means for detecting a non-receipt of a third message in response to the second message.

28. The apparatus of claim 27, further comprising:
means for estimating a timing value for the detected preamble, the timing value indicating a particular coverage area of the base station; and
means for maintaining a count of detected PRACH preambles with the estimated timing value that result in a communication failure.

29. The apparatus of claim 25, further comprising:
means for inserting information indicating an assignment of one or more root sequences assigned to the base station into a token, the one or more root sequences being used to generate a physical random access channel (PRACH) preamble; and
means for releasing the token to a second base station.

30. The apparatus of claim 25, further comprising:
means for receiving a token from a second base station;
means for extracting, from the received token, information indicating an assignment of one or more root sequences assigned to the second base station, the one or more root sequences being used to generate a physical random access channel (PRACH) preamble;
means for adjusting an assignment of one or more root sequences assigned to the base station based on the extracted information.

31. A computer program product to adjust a ZeroCorrelationZoneConfig (Ncs) parameter of a base station, the computer program product comprising a non-transitory computer-readable medium storing instructions executable by a processor to:
set an initial Ncs parameter,
determine a count of timing synchronization failures between a mobile device and the base station, and
upon determining that the count of timing synchronization failures exceeds a threshold, dynamically adjust the initial Ncs parameter.

32. The computer program product of claim 31, wherein the instructions are executable by the processor to:
detect an occurrence of a timing synchronization failure.

33. The computer program product of claim 32, wherein the instructions to detect an occurrence of a timing synchronization failure are executable by the processor to:
receive a first message comprising a physical random access channel (PRACH) preamble,
generate preamble identification (ID) for the received PRACH preamble,
transmit a second message comprising the preamble ID, and
upon transmission of the second message, detect a non-receipt of a third message in response to the second message.

34. The computer program product of claim 33, wherein the instructions are executable by the processor to:
estimate a timing advanced value for the received PRACH preamble, the timing advanced value indicating a first coverage area of the base station, and
maintain a count of timing synchronization failures that occur in the first coverage area of the base station.

35. A method for generating a report to be used to determine whether to adjust a ZeroCorrelationZoneConfig (Ncs) parameter of a base station, comprising:
transmitting a first message to the base station that includes a preamble,
receiving a second message from the base station that includes a preamble ID,
maintaining a log indicating whether a transmission of a third message to the base station is aborted, and
transmitting the report, including the log, to the base station, the report being used by the base station to determine whether to adjust the Ncs parameter.

36. The method of claim 35, wherein the report comprises a bit of information instructing the base station to adjust the Ncs parameter.

37. The method of claim 35, further comprising:
processing the report to determine whether to instruct the base station to adjust the Ncs parameter.

38. The method of claim 35, further comprising:
transmitting the report without processing the report to determine whether to instruct the base station to adjust the Ncs parameter.

39. The method of claim 35, further comprising:
transmitting the report to the base station upon receiving a request from the base station.

40. The method of claim 35, further comprising:
transmitting the report to the base station according to a reporting timing cycle.

* * * * *